(12) United States Patent
Caiozza

(10) Patent No.: US 6,551,506 B2
(45) Date of Patent: Apr. 22, 2003

(54) MAGNETIC OIL FILTERING APPARATUS

(76) Inventor: Joseph C. Caiozza, 321 W. Market St., Long Beach, NY (US) 11561

( * ) Notice: Subject to any disclaimer, the term of this patent is extended or adjusted under 35 U.S.C. 154(b) by 103 days.

(21) Appl. No.: 09/780,117

(22) Filed: Feb. 10, 2001

(65) Prior Publication Data

US 2001/0052489 A1 Dec. 20, 2001

Related U.S. Application Data

(63) Continuation-in-part of application No. 09/594,453, filed on Jun. 15, 2000, now Pat. No. 6,444,123.

(51) Int. Cl.[7] ................................................ B01D 35/06
(52) U.S. Cl. ................................ 210/222; 210/DIG. 17; 184/6.25
(58) Field of Search ................................. 210/168, 222, 210/223, 186, DIG. 17; 184/6.25; 123/196 A, 196 AB

(56) References Cited

U.S. PATENT DOCUMENTS

| | | | | |
|---|---|---|---|---|
| 5,291,969 A | * | 3/1994 | Diederich, Jr. | ........ 123/196 AB |
| 5,423,983 A | * | 6/1995 | Chiang | ........................ 184/6.25 |
| 5,510,024 A | * | 4/1996 | Caiozza | ......................... 210/186 |
| 5,814,211 A | * | 9/1998 | Leo | ........................... 123/196 A |
| 5,961,824 A | * | 10/1999 | Caiozza | ........................ 184/6.25 |
| 5,965,018 A | * | 10/1999 | Caiozza | ........................ 184/6.25 |
| 6,270,667 B1 | * | 8/2001 | Nakamura | .................. 184/6.25 |
| 6,444,123 B1 | * | 9/2002 | Caiozza | ........................ 210/223 |

* cited by examiner

Primary Examiner—David A. Reifsnyder

(57) ABSTRACT

A magnetic oil filtering apparatus includes a magnetic assembly apparatus which includes a magnet assembly base plate which includes base plate oil flow channels and an internally threaded connection channel for mounting on an externally threaded mounting. A magnetic assembly housing is connected to the magnet assembly base plate. A magnet module is connected to the magnetic assembly housing. The magnet assembly base plate can be connected to an oil filter mounting stem or a magnetic assembly mounting stem on an engine block. The magnet module can be mounted on a top or side portion of the magnetic assembly housing. Inside the magnetic assembly housing, an inlet-to-magnet-area flow director can be provided. The inlet-to-magnet-area flow director directs oil flow to the portion of the magnetic assembly housing which is adjacent to the mounted magnet module.

18 Claims, 15 Drawing Sheets

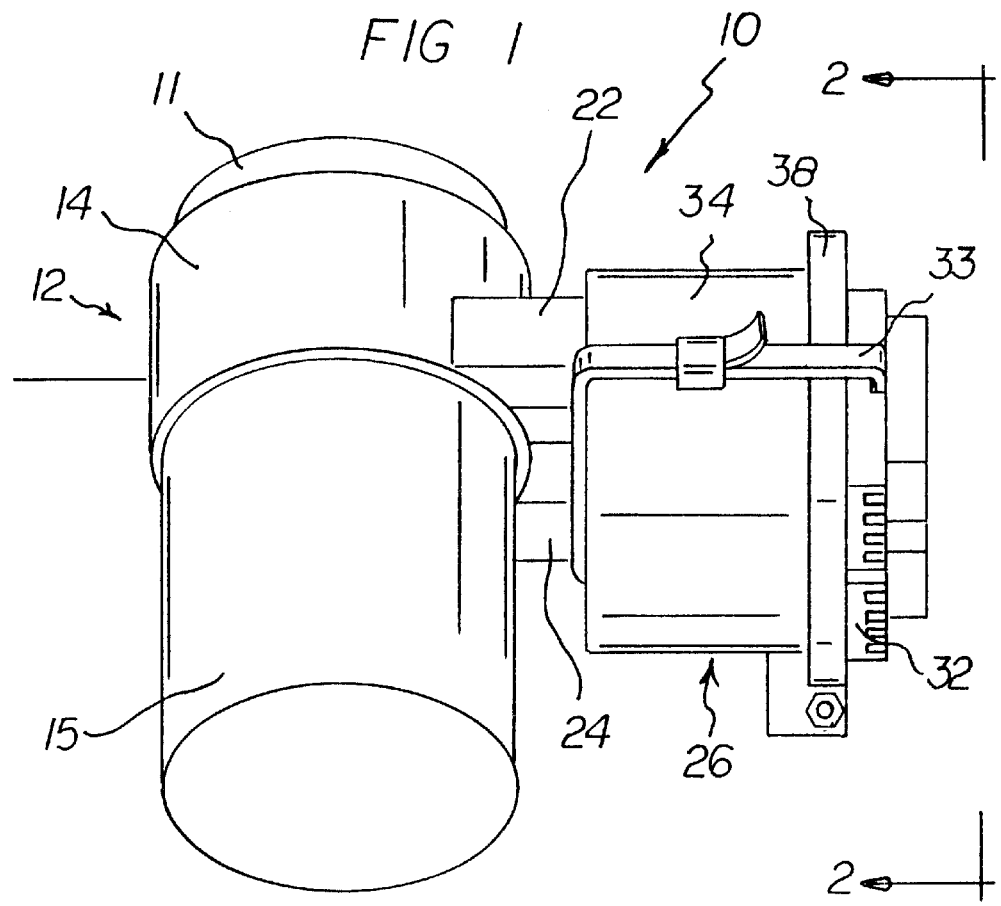
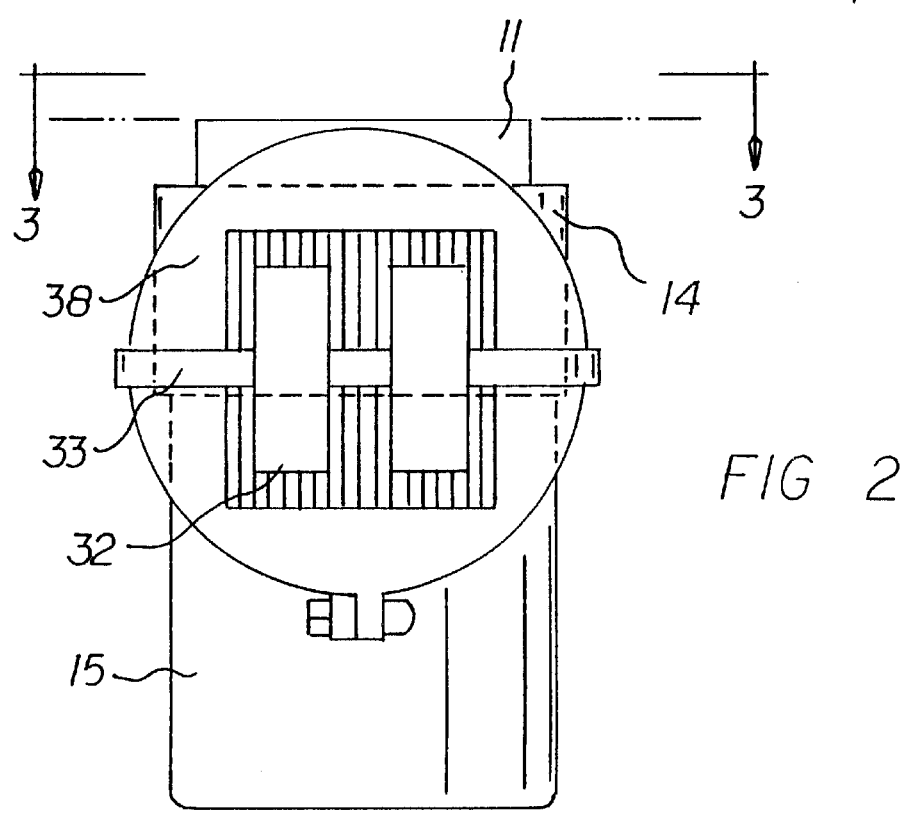

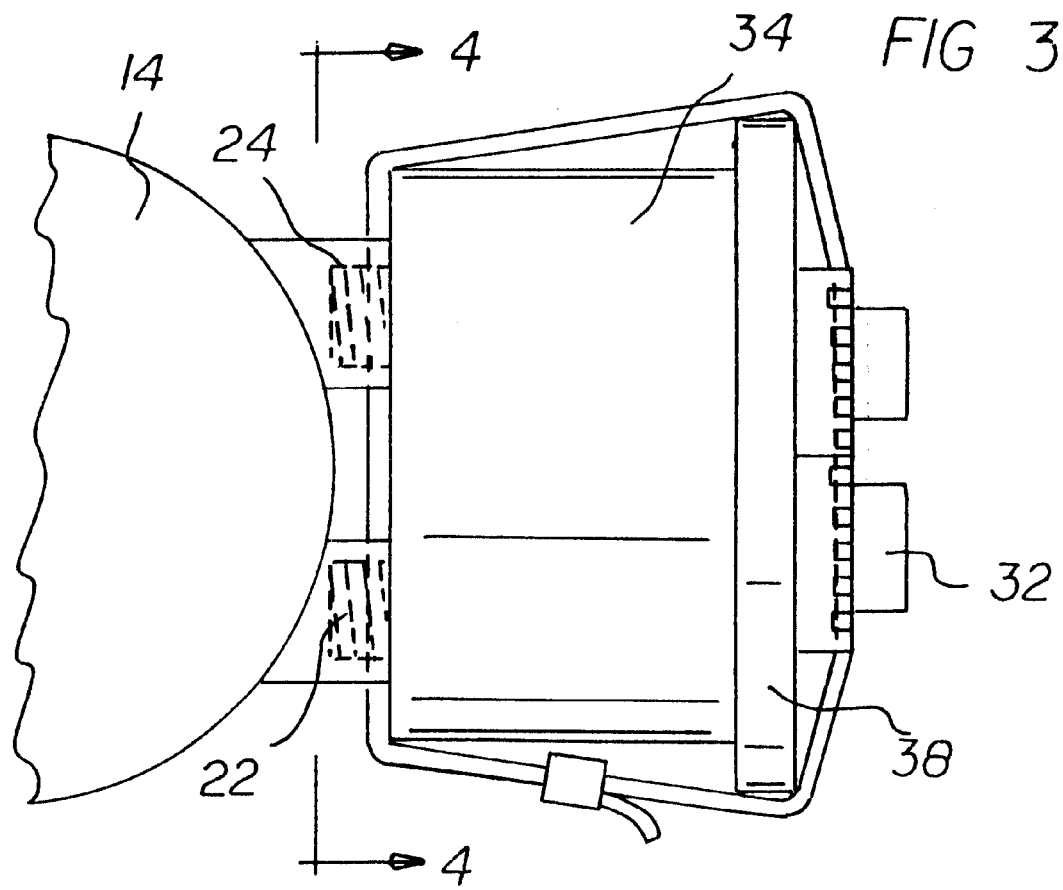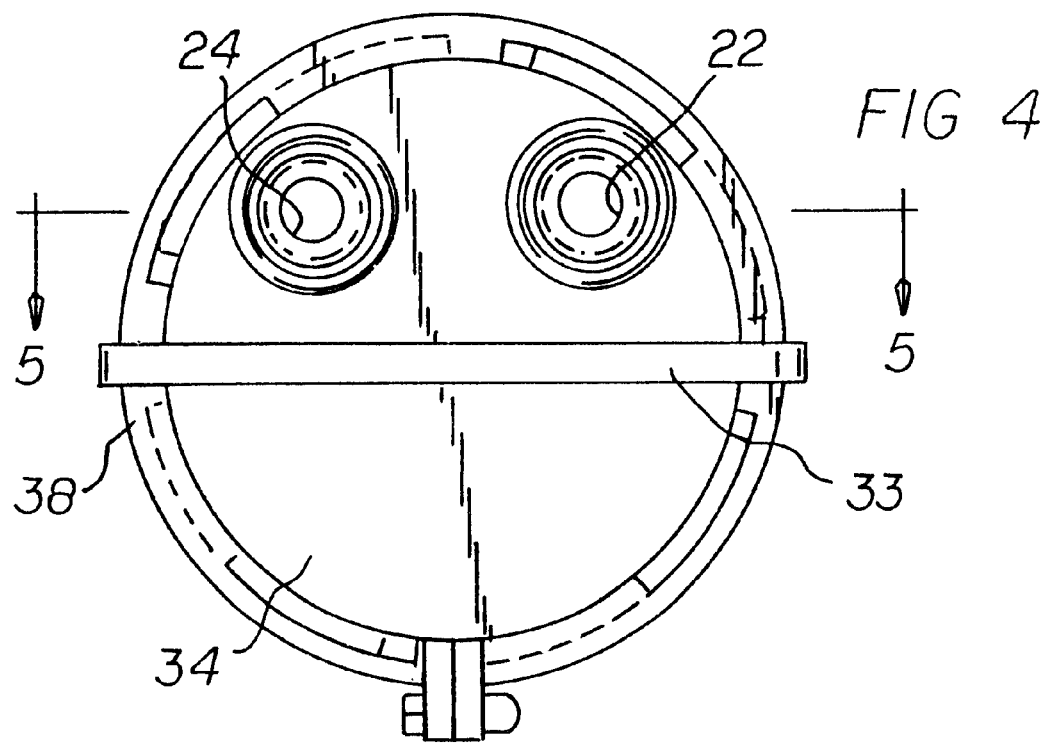

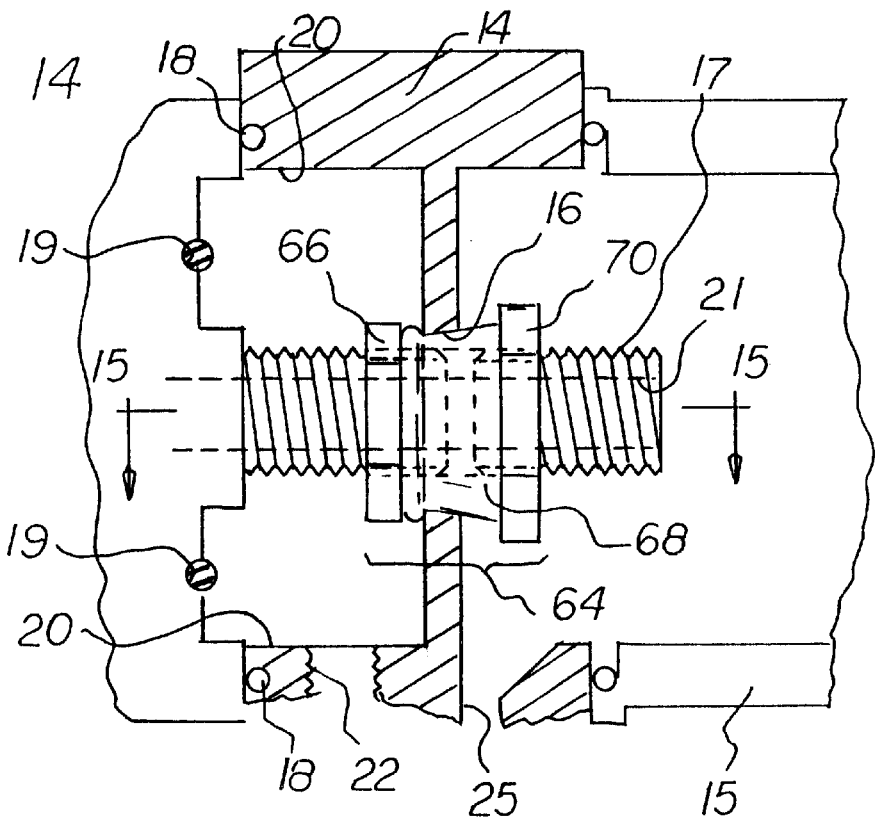
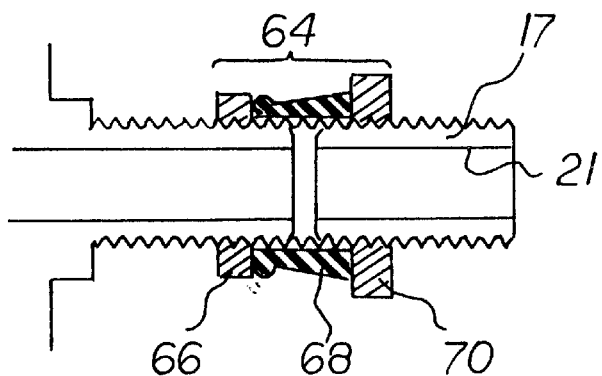
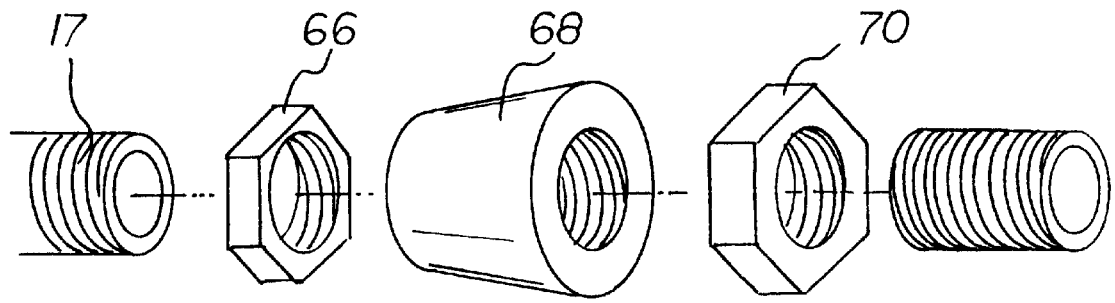

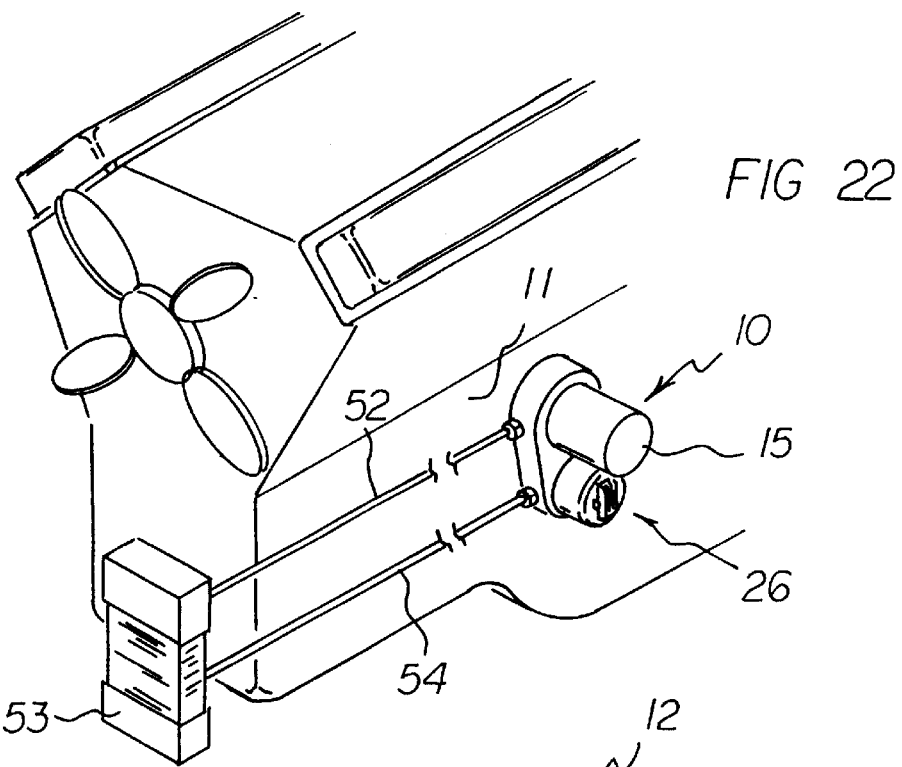
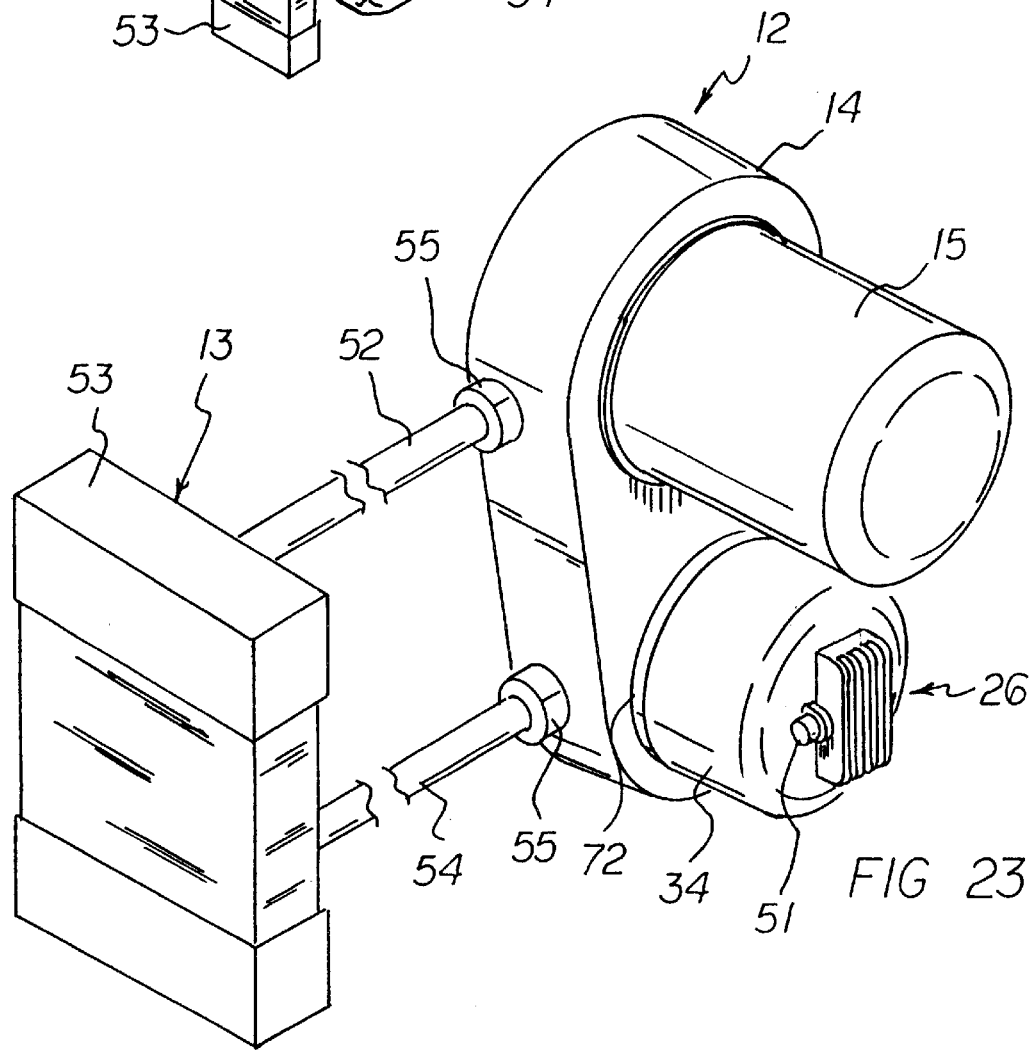

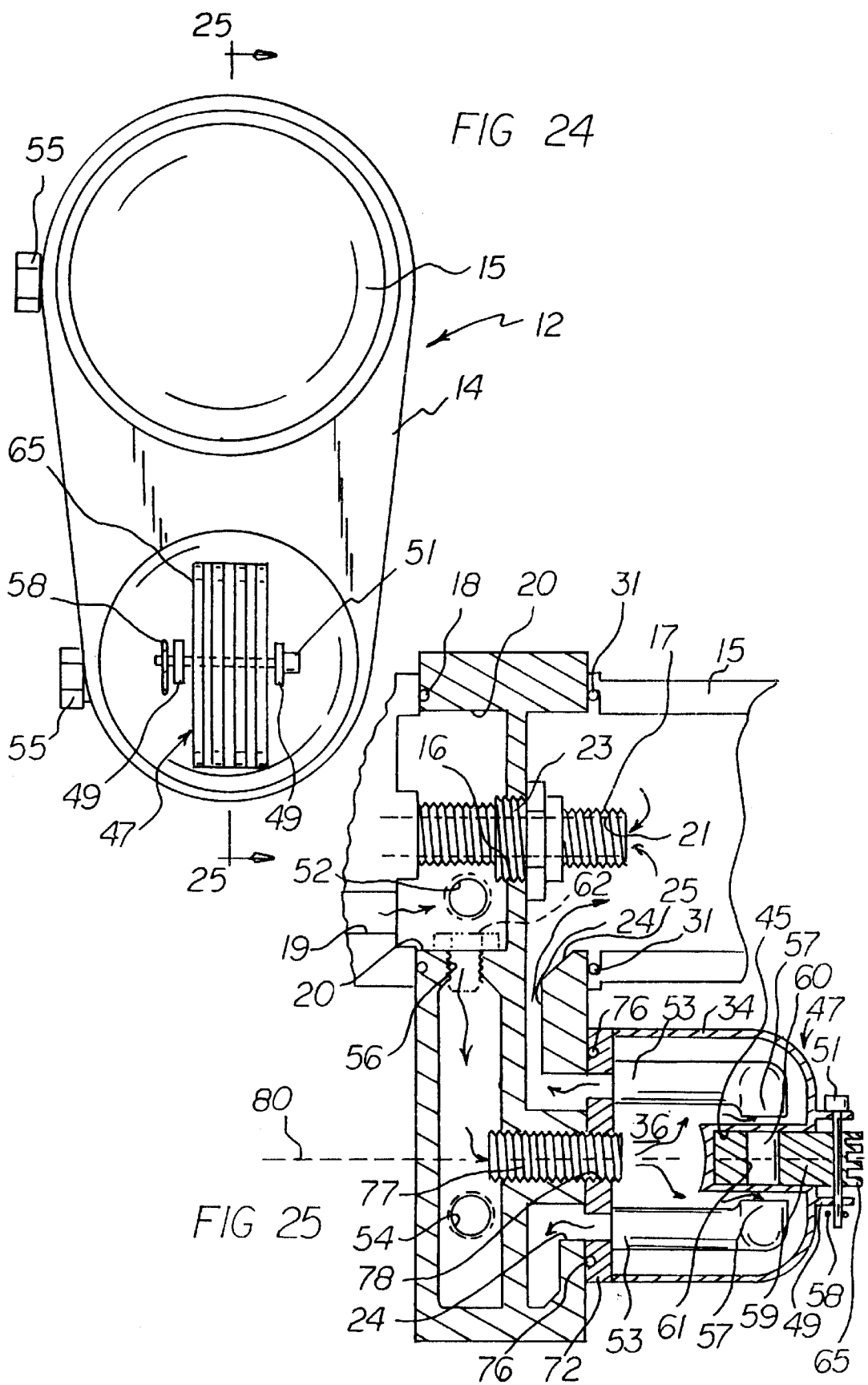

MAGNETIC OIL FILTERING APPARATUS

CROSS-REFERENCE TO RELATED APPLICATION

This application is a continuation-in-part (C-I-P) application of my earlier patent application, Ser. No. 09/594,453, filed Jun. 15, 2000 now U.S. Pat. No. 6,444,123, the specification of which earlier application hereby is incorporated herein by this reference.

BACKGROUND OF THE INVENTION

1. Field of the Invention

The present invention relates generally to devices for filtering engine oil and, more particularly, to engine oil filtering devices that are mounted on an engine block.

2. Description of the Prior Art

Generally, the oil of an internal combustion engine is filtered by a removable and replaceable oil filter cartridge that is screwed onto an oil filter mounting stem on the engine block of the internal combustion engine. Limitations of simple oil filter cartridges have been disclosed in U.S. Pat. No. 5,510,024 of the present inventor in which the present inventor has disclosed a magnetic attachment for an oil filter cartridge.

With the magnetic treatment device disclosed in U.S. Pat. No. 5,510,024, when an oil filter cartridge is replaced, the magnetic assembly that is affixed to the oil filter cartridge must be removed from the oil filter cartridge that is being replaced and must be affixed to the replacement oil filter cartridge. To avoid the needed for removing and replacing a magnetic assembly from an oil filter cartridge, it would be desirable if a magnetic oil filtering apparatus were provided that is not affixed to an oil filter cartridge.

When a magnetic assembly is affixed to a oil filter cartridge, the efficiency of separation of metal particles from the oil is largely determined by the amount of oil that flows in close proximity to the inner wall of the oil filter cartridge, and such efficiency is far from ideal. In this respect, it would be desirable if a magnetic assembly were provided that increases the efficiency of the separation of metal particles from engine oil.

U.S. Pat. No. 5,291,969 discloses an adaptor that is interposed between an engine block and an oil filter cartridge. The adaptor provides a flow path for engine oil to go to and return from an oil cooling assembly. In doing so, the oil filter cartridge is conventional, and is not modified. However, the oil cooling assembly performs no filtration function. From a study of U.S. Pat. No. 5,291,969 which teaches the use of a conventional, unaltered oil filter cartridge, and from a study of U.S. Pat. No. 5,510,024 which teaches the desirability of filtering engine oil with the aid of a magnetic assembly, it would be desirable if a magnetic oil filtering apparatus were provided that is interposed between an engine block and a conventional, unaltered oil filter cartridge.

Furthermore, it would be desirable if a magnetic oil filtering apparatus were provided which employs both magnetic filtering and oil cooling.

Still other features would be desirable in a magnetic oil filtering apparatus. For example, for an adaptor that is interposed between an engine block and an oil filter cartridge, it is important that good oil seals be provided. More specifically, it is important that a good oil seal be provided between the adaptor and the engine block. In addition, it is important that a good oil seal be provided between the adaptor and the oil filter mounting stem.

Thus, while the foregoing body of prior art indicates it to be well known to use a magnetic oil filtering apparatus, the prior art described above does not teach or suggest a magnetic oil filtering apparatus which has the following combination of desirable features: (1) is not affixed to an oil filter cartridge; (2) increases the efficiency of the separation of metal particles from engine oil over a magnetic assembly affixed to an oil filter cartridge; (3) is interposed between an engine block and a conventional, unaltered oil filter cartridge; (4) provides both magnetic filtering and oil cooling; (5) provides a good oil seal between an adaptor and an engine block; and (6) provides a good oil seal between the adaptor and the oil filter mounting stem. The foregoing desired characteristics are provided by the unique magnetic oil filtering apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a magnetic oil filtering apparatus which fits onto an oil filter mounting stem of an engine block which includes oil output channels. The magnetic oil filtering apparatus includes an adaptor unit which includes an adaptor housing, a mounting-stem-reception channel in the adaptor housing, an adaptor-to-stem seal received on the oil filter mounting stem for sealing off the mounting-stem-reception channel, an adaptor-to-block seal portion located on a bottom portion of the adaptor unit, a block-to-adaptor input channel for receiving oil flow from the oil output channels of the engine block, an adaptor-to-magnetic-assembly output channel, a magnetic-assembly-to-adaptor input channel, and an adaptor-to-filter-cartridge channel which is in communication with the magnetic-assembly-to-adaptor input channel. The adaptor-to-block seal portion is in a form of an O-ring.

A magnetic assembly includes a magnetic assembly housing and is connected to the adaptor-to-magnetic-assembly output channel and to the magnetic-assembly-to-adaptor input channel. The magnetic assembly housing defines an interior oil flow chamber between the adaptor-to-magnetic-assembly output channel and the magnetic-assembly-to-adaptor input channel. The magnetic assembly includes magnet elements attached to an outside portion of the magnetic assembly housing. Magnetic-assembly-to-adaptor seals are located between the adaptor-to-magnetic-assembly output channel and the magnetic-assembly-to-adaptor input channel and the magnetic assembly. With the magnetic oil filtering apparatus in use, engine oil is treated with magnetic lines of force to trap metal particles in the vicinity of the magnet elements prior to entry of the engine oil into the oil filter cartridge.

The adaptor-to-stem seal can be in a form of an adaptor-to-stem sealing nut. An attachment strap is provided for securing the magnet elements to the magnetic assembly.

The magnetic assembly includes a proximal end and a distal end with respect to the adaptor unit. The proximal end is connected to the adaptor-to-magnetic-assembly output channel and the magnetic-assembly-to-adaptor input channel. The distal end includes magnet elements. The distal end is in a form of a removable cap secured to the magnetic assembly housing.

A flow director baffle is secured inside the interior oil flow chamber and directs oil flow inside the interior oil flow chamber to the vicinity of the magnet elements so that substantially all of the oil is subjected to the magnetic lines of force of the magnet elements. A first connector nipple connects the magnetic assembly to the adaptor-to-magnetic-assembly output channel, and a second connector nipple connects the magnetic assembly to the magnetic-assembly-to-adaptor input channel. The second connector nipple also secures the flow director baffle to the magnetic assembly.

The magnetic assembly housing includes locking tabs, and the removable cap includes tab-reception slots and tab-reception ramps for receiving the locking tabs for locking the removable cap onto the magnetic assembly housing. A cap-to-housing sealing ring is located between the removable cap and the magnetic assembly housing.

With a second embodiment of the invention, an oil cooler assembly is connected to the adaptor unit. The adaptor unit includes an oil-cooler-output channel, an oil-cooler-input channel, and a shunt channel located between the oil-cooler-output channel and the oil-cooler-input channel. Connector fittings are attached to the adaptor housing and are associated with each of the oil-cooler-output channel and the oil-cooler-input channel.

An output channel plug fits into the oil-cooler-output channel, and an input channel plug fits into the oil-cooler-input channel. A shunt channel plug fits into the second quick-connect coupler. The interior oil flow chamber includes a funnel portion which is in communication with the magnetic-assembly-to-adaptor input channel.

With a third embodiment of the invention, the adaptor-to-stem seal is in a form of an expansion seal assembly. The expansion seal assembly includes a first compression nut supported on the oil filter mounting stem on one side of the mounting-stem-reception channel. A compressible, annular sealing member is supported on the oil filter mounting stem, is in contact with the first compression nut, and extends through the block-to-adaptor input channel to a portion of the oil filter mounting stem on the other side of the mounting-stem-reception channel. A second compression nut is supported on the oil filter mounting stem on the other side of the mounting-stem-reception channel and is in contact with the compressible, annular sealing member.

In accordance with fourth through seventh embodiments of the invention, a magnetic assembly apparatus includes a magnet assembly base plate which includes base plate oil flow channels and an internally threaded connection channel for mounting on an externally threaded mounting. A magnetic assembly housing is connected to the magnet assembly base plate. A magnet module is connected to the magnetic assembly housing.

For the fourth embodiment of the invention, a magnetic oil filtering apparatus fits onto an engine block which includes an oil filter mounting stem, oil output channels associated with the oil filter mounting stem, a magnetic assembly mounting stem, and supplementary oil input channels associated with the magnetic assembly mounting stem. The magnetic oil filtering apparatus includes a magnetic assembly mounted on the magnetic assembly mounting stem, wherein engine oil flows from the engine block, through the magnetic assembly mounting stem, through the magnetic assembly, and back to the engine block through the supplementary oil input channels for separating metal particles out from the engine oil by the magnetic assembly.

More specifically, the magnetic assembly includes a magnet assembly base plate which includes base plate oil flow channels which are in communication with the supplementary oil input channels of the engine block. The magnet assembly base plate includes an internally threaded connection channel which is connected to the magnetic assembly mounting stem. A magnetic assembly housing is connected to the magnet assembly base plate, wherein the magnetic assembly housing which includes a magnet module reception well, and magnet module support brackets are located adjacent to the magnet module reception well. A magnet module is received in the magnet module reception well and is supported by the magnet module support brackets. A module retention pin is threaded through the magnet module support brackets and the magnet module for retaining the magnet module in the magnet module reception well.

The magnet module reception well includes well side walls and a well floor located at distal ends of the well side walls. The well floor includes a concave outer wall surface facing the magnetic assembly mounting stem for directing oil flow inside the interior oil flow chamber and around the well side walls to the funnel input ends. A pin locking member is connected to a distal end of the module retention pin.

The magnetic assembly housing defines an interior oil flow chamber, and the magnet module reception well is located in a central portion of the interior oil flow chamber.

The magnetic assembly further includes a pair of oil flow funnels connected to the magnet assembly base plate and in communication with the base plate oil flow channels and extending into the interior oil flow chamber. Each of the oil flow funnels includes a funnel input end located adjacent to a side wall of the magnet module reception well. Each of the oil flow funnels is located beside a central longitudinal axis in the magnetic assembly housing.

The magnet module includes a magnet reception block which includes magnet reception channels and a retention pin reception channel. A plurality of cylindrical magnets are received in the magnet reception block. The cylindrical magnets are in registration with the funnel input ends when the magnet module is placed in the magnet module reception well. The magnet reception block includes a top heat sink portion.

In accordance with a fifth embodiment of the invention, a magnetic oil filtering apparatus fits onto an oil filter mounting stem of an engine block which includes oil output channels. An adaptor unit is mounted on the oil filter mounting stem, wherein the adaptor unit includes an adaptor housing, a mounting-stem-reception channel in the adaptor housing, an adaptor-to-stem seal received on the oil filter mounting stem for sealing off the mounting-stem-reception channel, an adaptor-to-block seal portion located on a bottom portion of the adaptor unit, a block-to-adaptor input channel for receiving oil flow from the oil output channels of the engine block, a combination adaptor-to-magnetic-assembly output channel and magnetic assembly mounting stem, a magnetic-assembly-to-adaptor input channel, and an adaptor-to-filter-cartridge channel which is in communication with the magnetic-assembly-to-adaptor input channel. A magnetic assembly is mounted on the adaptor unit. Engine oil flows from the engine block, through the oil output channels, through the adaptor unit, through the magnetic assembly, and back to the adaptor unit for separating metal particles out from the engine oil by the magnetic assembly.

The magnetic assembly includes a magnetic assembly housing connected to the magnet assembly base plate which is connected to the combination adaptor-to-magnetic-assembly output channel and magnetic assembly mounting stem, and wherein the magnetic assembly housing defines an interior oil flow chamber between the combination adaptor-to-magnetic-assembly output channel and magnetic assembly mounting stem and the magnetic-assembly-to-adaptor input channel.

In accordance with a sixth embodiment of the invention, a magnet module is in a form of a top-mounted magnet module that is located on a top portion of the magnetic assembly housing. The top-mounted magnet module is secured to the magnetic assembly housing by magnet module support brackets and a module retention pin which is threaded through the top-mounted magnet module and the magnet module support brackets.

An inlet-to-magnet-area flow director is connected to the magnet assembly base plate. The inlet-to-magnet-area flow director has an inlet end surrounding the internally threaded connection channel and has an outlet end in close proximity to a top portion of the magnetic assembly housing, under the top-mounted magnet module. The inlet-to-magnet-area flow director surrounds a portion of the central longitudinal axis of the magnetic assembly housing.

In accordance with a seventh embodiment of the invention, a magnet module is in a form of a side-mounted magnet module that is located on a side portion of the magnetic assembly housing. The side-mounted magnet module is secured to the magnetic assembly housing by of a housing/module encircling attachment strap. An inlet-to-magnet-area flow director is connected to the magnet assembly base plate. The inlet-to-magnet-area flow director has an inlet end surrounding the internally threaded connection channel and has an outlet end in close proximity to a side portion of the magnetic assembly housing, besides the side-mounted magnet module.

A bottom portion of the side-mounted magnet module surrounds a portion of the central longitudinal axis and is parallel to the central longitudinal axis of the magnetic assembly housing. Also, a top portion of the side-mounted magnet module is perpendicular to the central longitudinal axis.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least seven preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved magnetic oil filtering apparatus which has all of the advantages of the prior art and none of the disadvantages.

It is another object of the present invention to provide a new and improved magnetic oil filtering apparatus which may be easily and efficiently manufactured and marketed.

It is a further object of the present invention to provide a new and improved magnetic oil filtering apparatus which is of durable and reliable construction.

An even further object of the present invention is to provide a new and improved magnetic oil filtering apparatus which is susceptible of a low cost of manufacture with regard to both materials and labor, and which accordingly is then susceptible of low prices of sale to the consuming public, thereby making such magnetic oil filtering apparatus available to the buying public.

Still yet a further object of the present invention is to provide a new and improved magnetic oil filtering apparatus which is not affixed to an oil filter cartridge.

Still another object of the present invention is to provide a new and improved magnetic oil filtering apparatus that increases the efficiency of the separation of metal particles from engine oil over a magnetic assembly affixed to an oil filter cartridge.

Yet another object of the present invention is to provide a new and improved magnetic oil filtering apparatus which is interposed between an engine block and a conventional, unaltered oil filter cartridge.

Even another object of the present invention is to provide a new and improved magnetic oil filtering apparatus that provides both magnetic filtering and oil cooling.

Still a further object of the present invention is to provide a new and improved magnetic oil filtering apparatus which provides a good oil seal between an adaptor and an engine block.

Yet another object of the present invention is to provide a new and improved magnetic oil filtering apparatus that provides a good oil seal between the adaptor and the oil filter mounting stem.

Still yet another object of the present invention is to provide a new and improved magnetic oil filtering apparatus that is easily opened for cleaning and/or inspection; has no filter screen susceptible of clogging; and has filter element that needs to be periodically replaced.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a bottom perspective view showing a first embodiment of the magnetic oil filtering apparatus of the invention attached to an engine block.

FIG. 2 is a front view of the embodiment of the magnetic oil filtering apparatus shown in FIG. 1 taken along line 2—2 of FIG. 1.

FIG. 3 is a top view of the embodiment of the magnetic oil filtering apparatus of FIG. 2 taken along line 3—3 thereof.

FIG. 4 is a cross-sectional view of the embodiment of the invention shown in FIG. 3 taken along line 4—4 thereof.

FIG. 14 an enlarged cross-sectional view of a third embodiment of the invention in which a compressible, flexible sealing element is used to establish a seal with respect to an oil filter mounting stem.

FIG. 15 is a cross-sectional view of the portion of the embodiment of the invention shown in FIG. 14 taken along line 15—15 thereof.

FIG. 16 is an exploded view of the compressible, flexible sealing element and associated elements that are mounted on the oil filter mounting stem.

FIG. 22 is a perspective view of a fifth embodiment of the invention which includes an adaptor unit, an oil cooler assembly, and a magnetic assembly in accordance with the embodiment of the invention shown in FIGS. 17–21.

FIG. 23 is an enlarged perspective view of the embodiment of the invention shown in FIG. 22 removed from the engine block.

FIG. 24 is a front view of the embodiment of the invention shown in FIG. 23 with the oil cooler assembly removed from the embodiment.

FIG. 25 is a cross-sectional view of the embodiment of the invention shown in FIG. 24 taken along line 25—25 thereof.

DESCRIPTION OF THE PREFERRED EMBODIMENT

Figure 5:
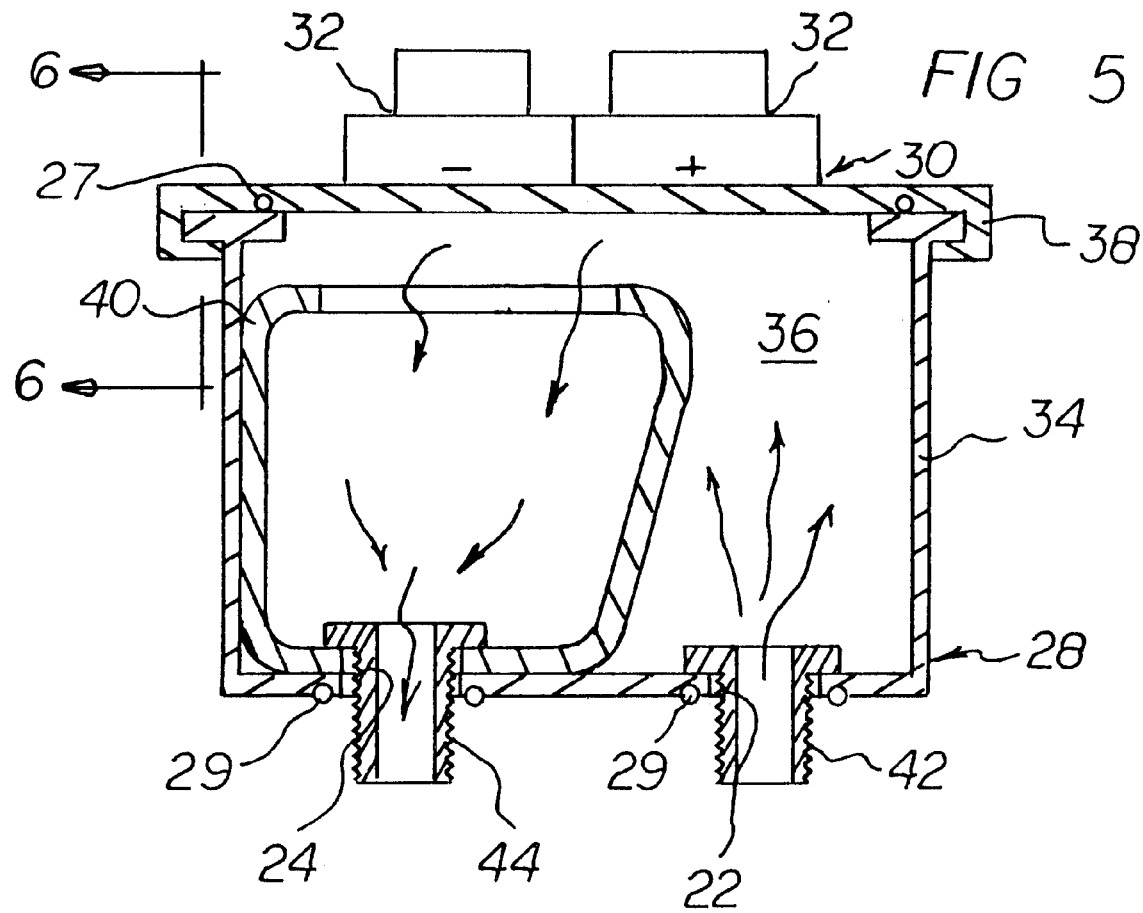
FIG. 5 is a cross-sectional view of the embodiment of the invention shown in FIG. 4 taken along line 5—5 thereof.
Figure 6:
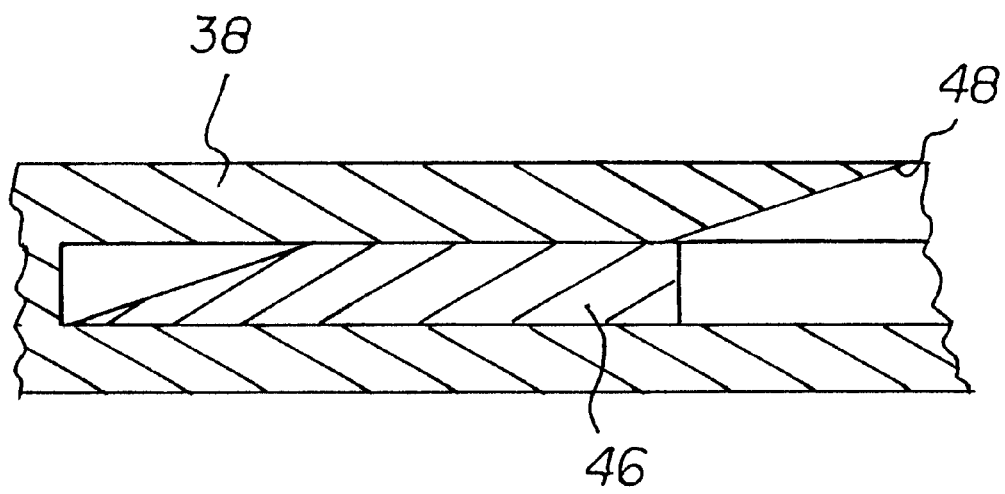
FIG. 6 is an enlarged cross-sectional view of the portion of the embodiment of the invention shown in FIG. 5 taken along line 6—6 thereof.
Figure 7:
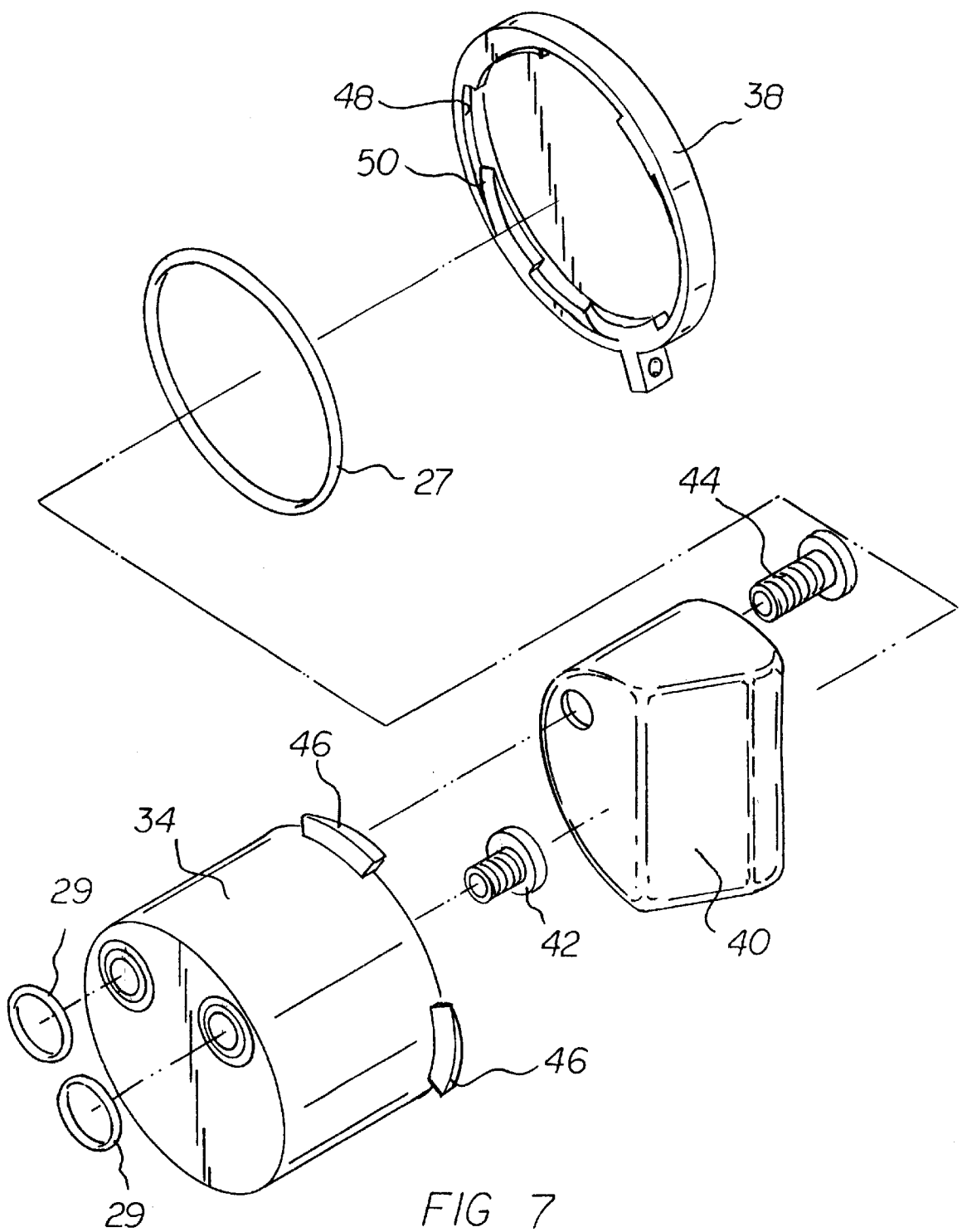
FIG. 7 is an exploded perspective view of a portion of the embodiment of the invention shown in FIG. 5.
Figure 8:
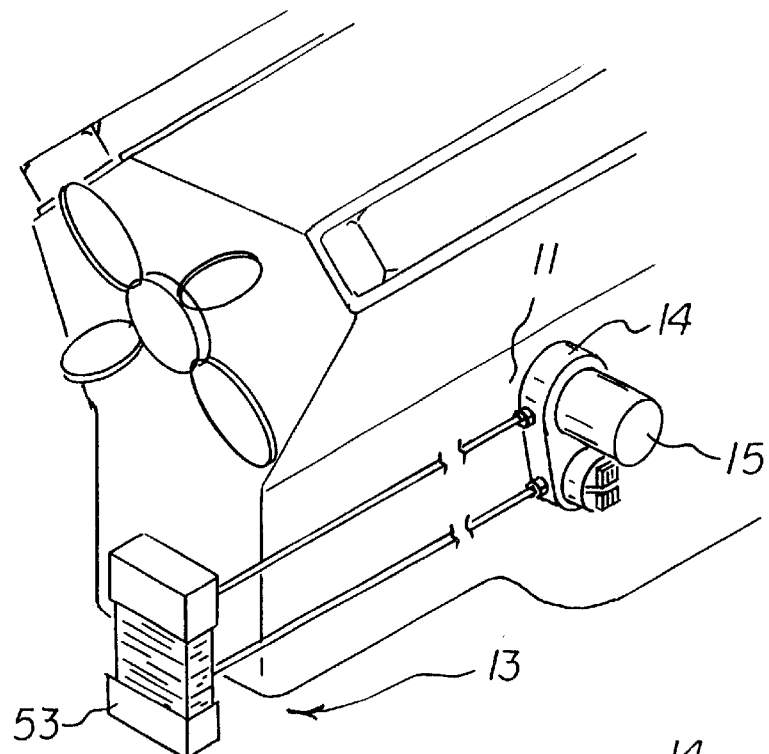
FIG. 8 is a perspective view of a second embodiment of the invention, which includes an oil cooler assembly, installed on an engine block.
Figure 9:
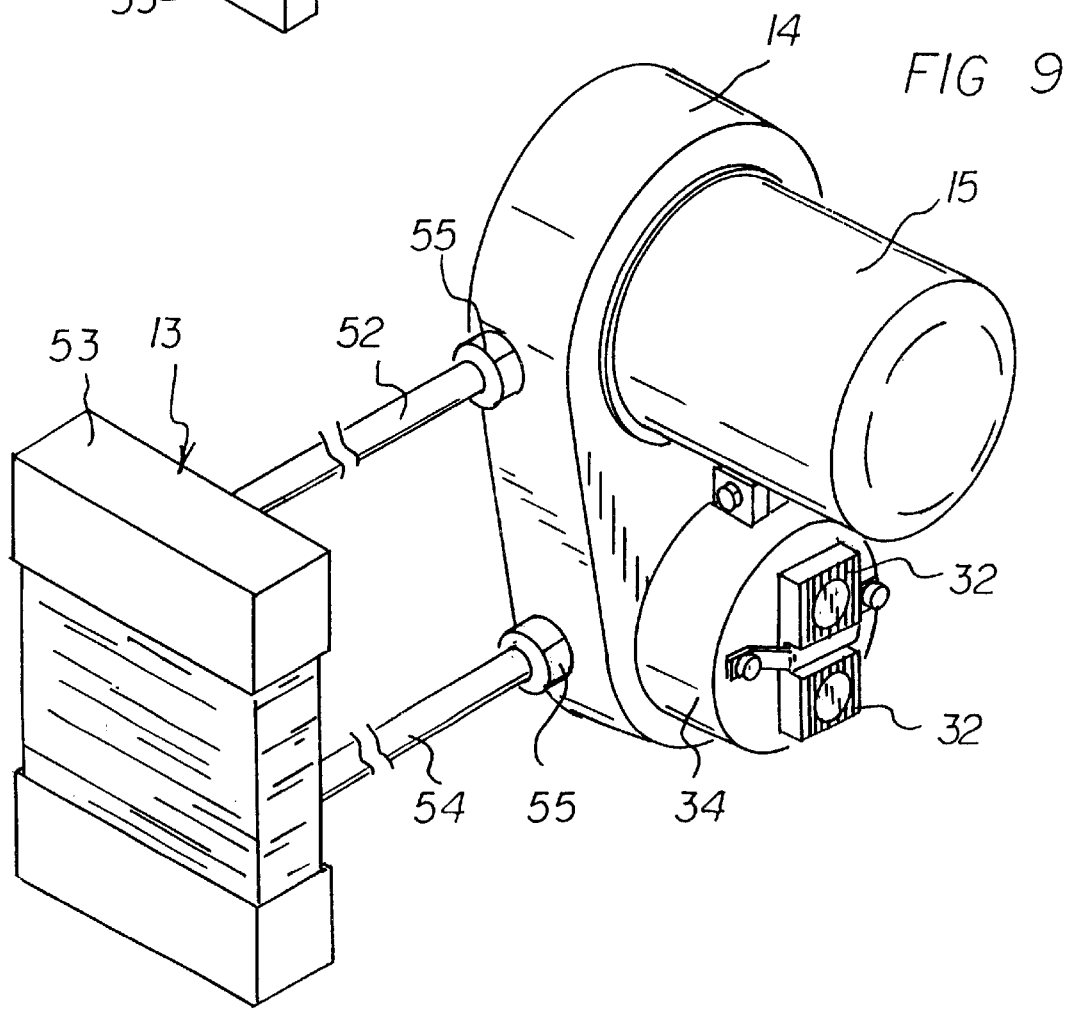
FIG. 9 is an enlarged perspective view of the embodiment of the invention shown in FIG. 8 removed from the engine block.

With reference to the drawings, a new and improved magnetic oil filtering apparatus embodying the principles and concepts of the present invention will be described.

Turning to FIGS. 1–7, a first embodiment of the magnetic oil filtering apparatus of the invention generally designated by reference numeral 10. With this embodiment, a magnetic oil filtering apparatus 10 is provided which fits onto an oil filter mounting stem 17 of an engine block 11 which includes oil output channels 19. The magnetic oil filtering apparatus 10 includes an adaptor unit 12 which includes an adaptor housing 14, a mounting-stem-reception channel 16 in the adaptor housing 14, an adaptor-to-stem seal received on the oil filter mounting stem 17 for sealing off the mounting-stem-reception channel 16, an adaptor-to-block seal portion 18 located on a bottom portion of the adaptor unit 12, a block-to-adaptor input channel 20 for receiving oil flow from the oil output channels 19 of the engine block 11, an adaptor-to-magnetic-assembly output channel 22, a magnetic-assembly-to-adaptor input channel 24, and an adaptor-to-filter-cartridge channel 25 which is in communication with the magnetic-assembly-to-adaptor input channel 24. The adaptor-to-block seal portion 18 is in a form of an O-ring 18.

A magnetic assembly 26 includes a magnetic assembly housing 34 and is connected to the adaptor-to-magnetic-assembly output channel 22 and to the magnetic-assembly-to-adaptor input channel 24. The magnetic assembly housing 34 defines an interior oil flow chamber 36 between the adaptor-to-magnetic-assembly output channel 22 and the magnetic-assembly-to-adaptor input channel 24. The magnetic assembly 26 includes magnet elements 32 attached to an outside portion of the magnetic assembly housing 34. Magnetic-assembly-to-adaptor seals 29 are located between the adaptor-to-magnetic-assembly output channel 22 and the magnetic-assembly-to-adaptor input channel 24 and the magnetic assembly 26.

The adaptor-to-stem seal can be in a form of an adaptor-to-stem sealing nut 23. An attachment strap 33 is provided for securing the magnet elements 32 to the magnetic assembly 26.

The magnetic assembly 26 includes a proximal end 28 and a distal end 30 with respect to the adaptor unit 12. The proximal end 28 is connected to the adaptor-to-magnetic-assembly output channel 22 and the magnetic-assembly-to-adaptor input channel 24. The distal end 30 includes magnet elements 32. The distal end 30 is in a form of a removable cap 38 secured to the magnetic assembly housing 34.

A flow director baffle 40 is secured inside the interior oil flow chamber 36 and directs oil flow inside the interior oil flow chamber 36 to the vicinity of the magnet elements 32 so that the oil is subjected to the magnetic lines of force of the magnet elements 32. A first connector nipple 42 connects the magnetic assembly 26 to the adaptor-to-magnetic-assembly output channel 22, and a second connector nipple 44 connects the magnetic assembly 26 to the magnetic-assembly-to-adaptor input channel 24. The second connector nipple 44 also secures the flow director baffle 40 to the magnetic assembly 26.

The magnetic assembly housing 34 includes locking tabs 46, and the removable cap 38 includes tab-reception slots 48 and tab-reception ramps 50 for receiving the locking tabs 46 for locking the removable cap 38 onto the magnetic assembly housing 34. A cap-to-housing sealing ring 27 is located between the removable cap 38 and the magnetic assembly housing 34.

Figures 10, 11:
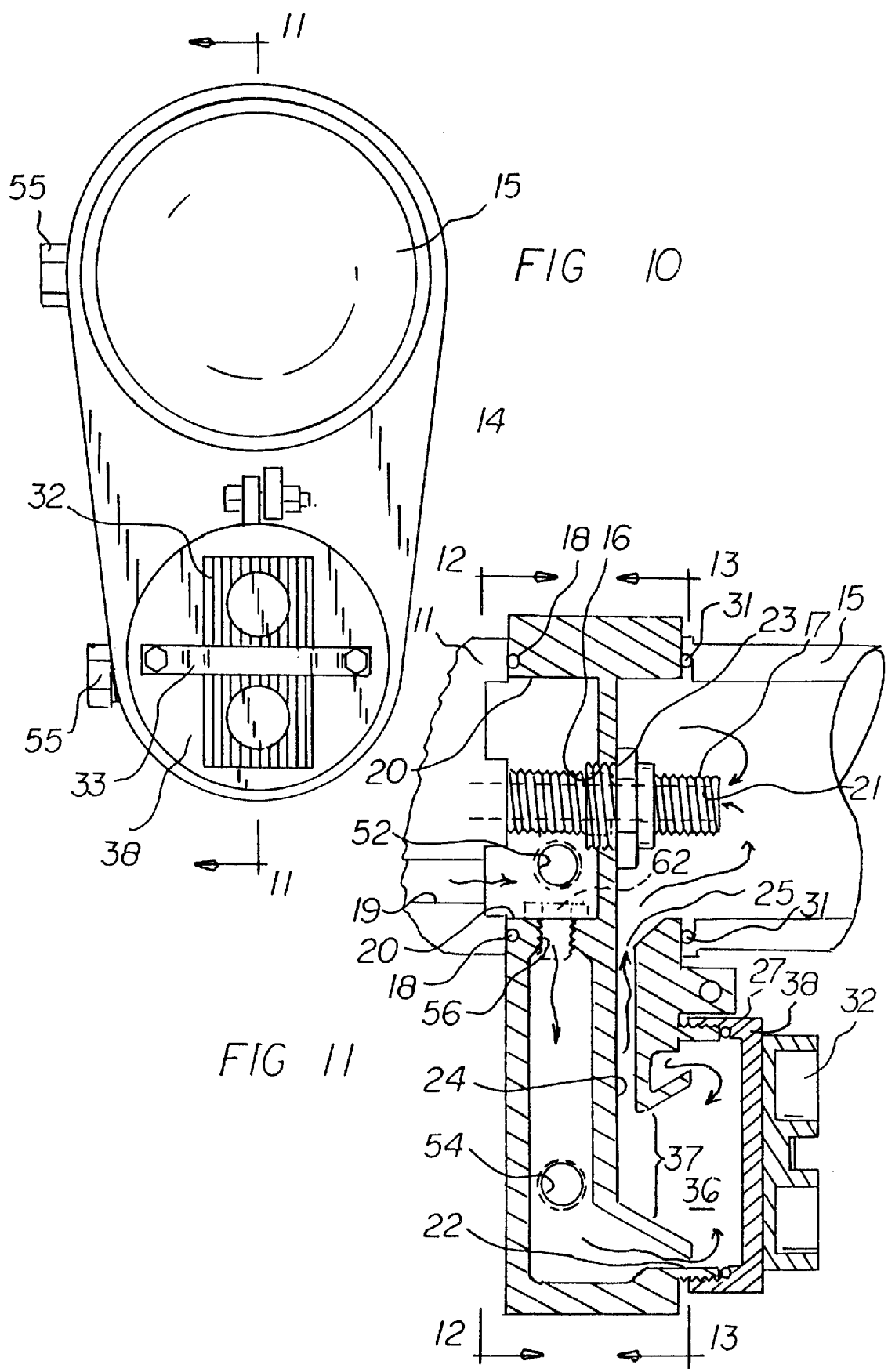
FIG. 10 is a front view of the embodiment of the invention shown in FIG. 9 with the oil cooler assembly removed from the embodiment.
FIG. 11 is a cross-sectional view of the embodiment of the invention shown in FIG. 10 taken along line 11—11 thereof.
Figure 12:
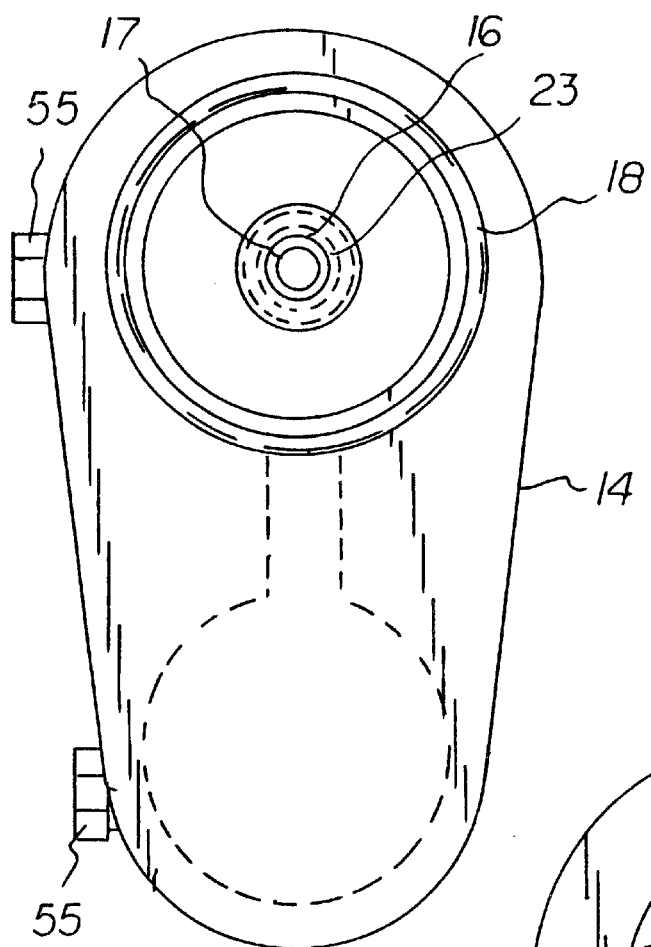
FIG. 12 is a view of the embodiment of the invention shown in FIG. 11 taken along line 12—12 thereof.
Figure 13:
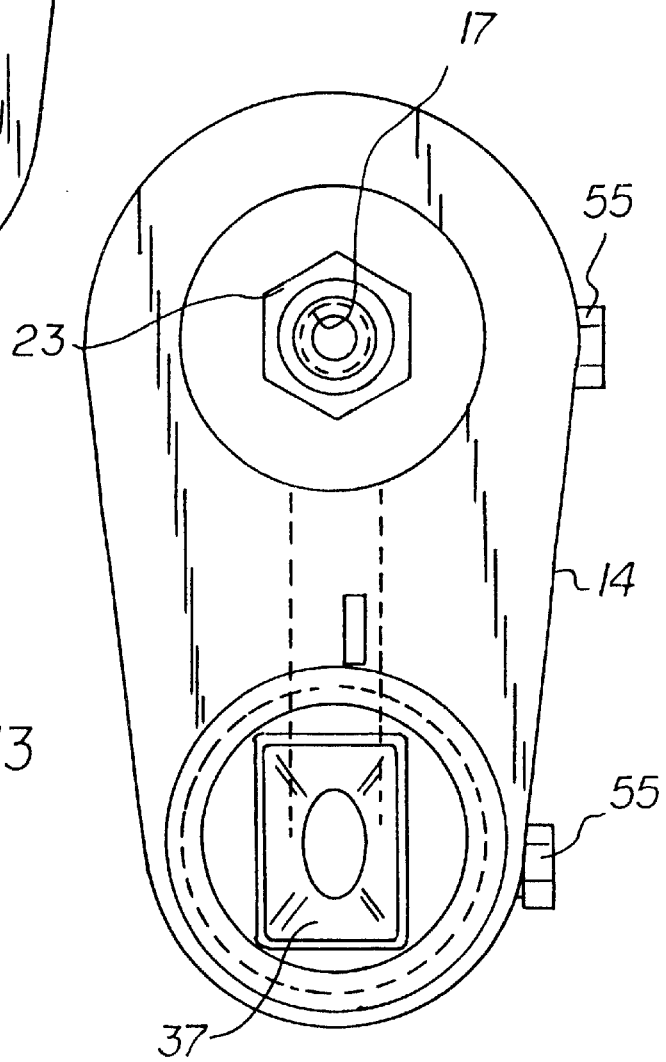
FIG. 13 is a view of the embodiment of the invention shown in FIG. 11 taken along line 13—13 thereof.
Figure 17:
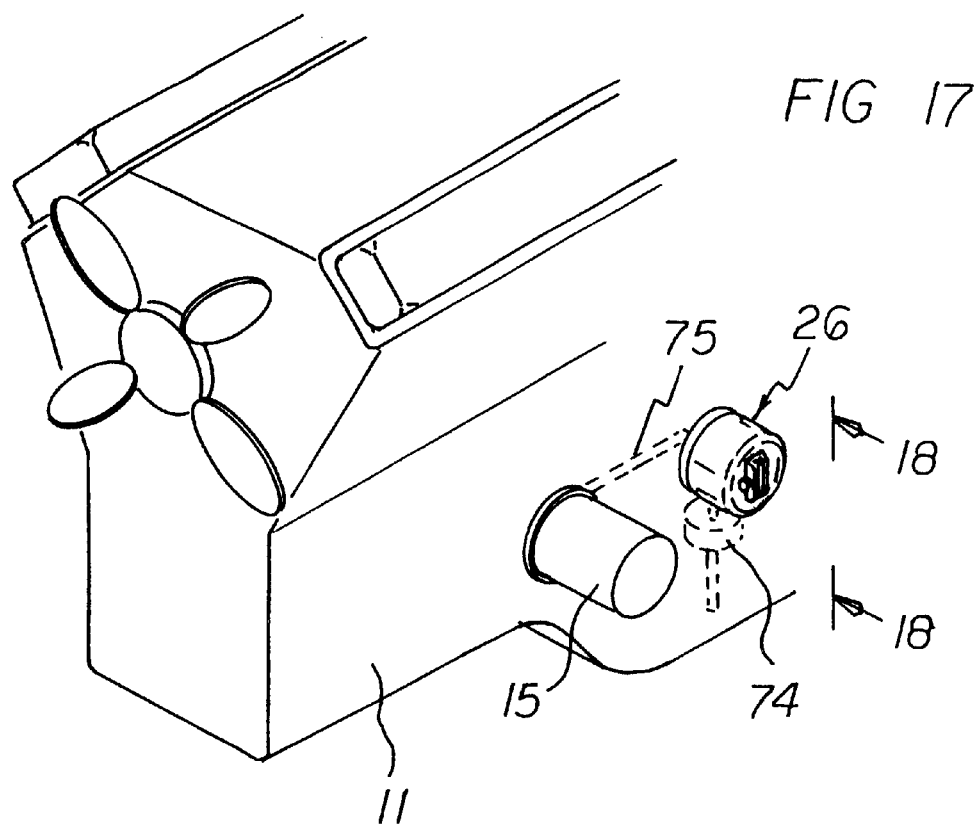
FIG. 17 is a perspective view of a fourth embodiment of the invention, which includes a magnetic assembly attached directly to a magnetic assembly mounting stem fixed to an engine block.
Figure 18:
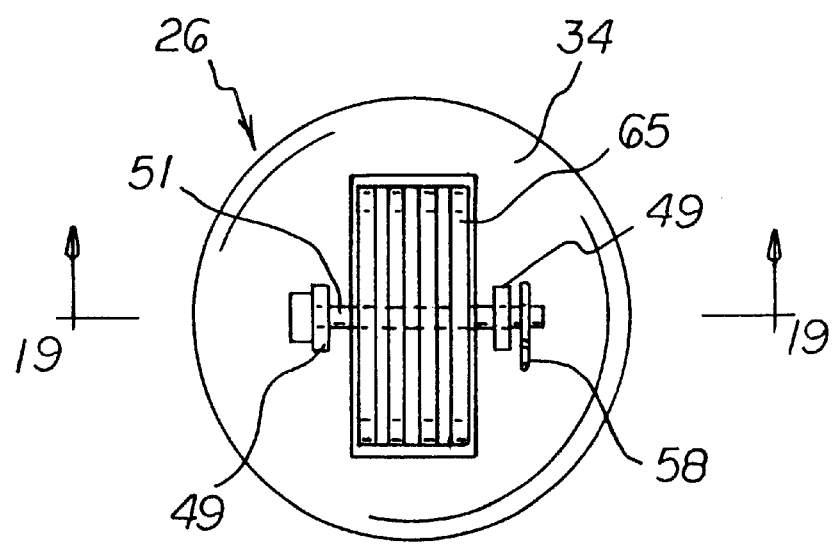
FIG. 18 is an enlarged top view of the embodiment of the invention shown in FIG. 17 taken along line 18—18 thereof.
Figure 19:
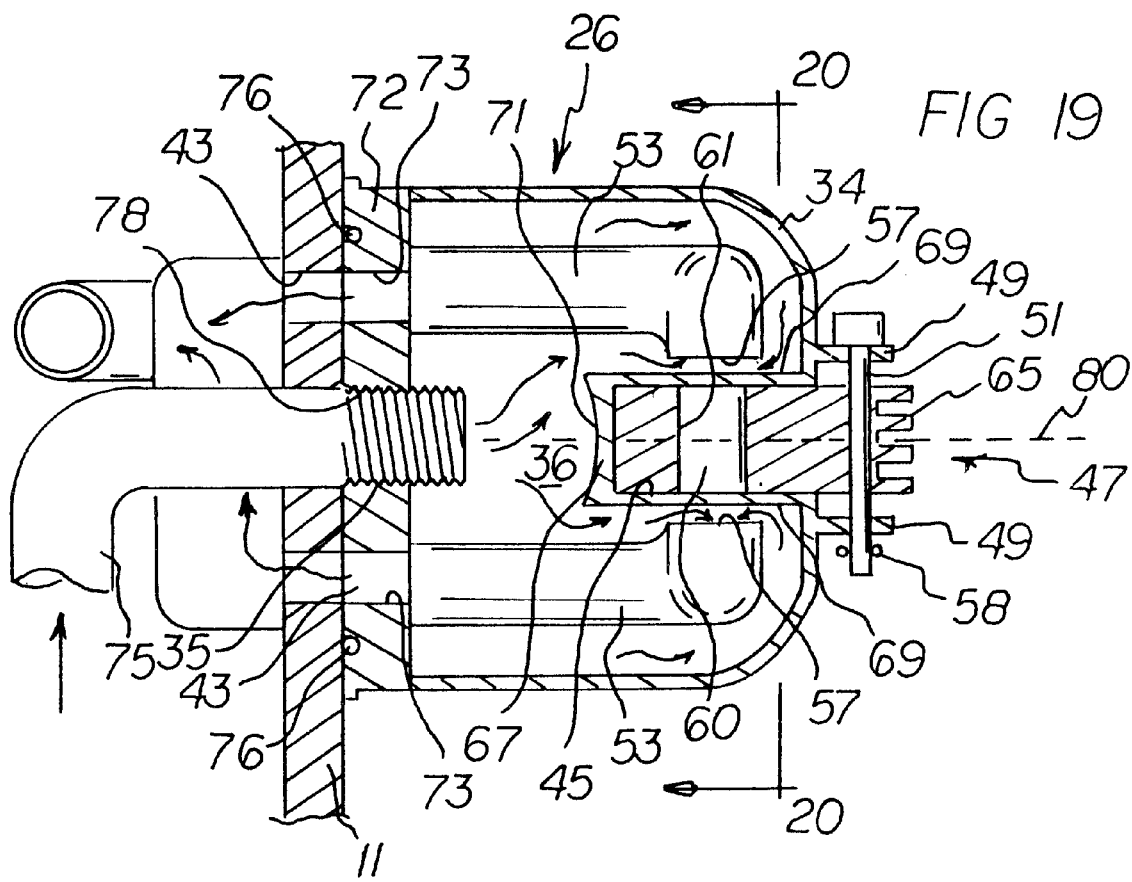
FIG. 19 is a cross-sectional view of the embodiment of the invention shown in FIG. 18 taken along line 19—19 thereof.
Figure 20:
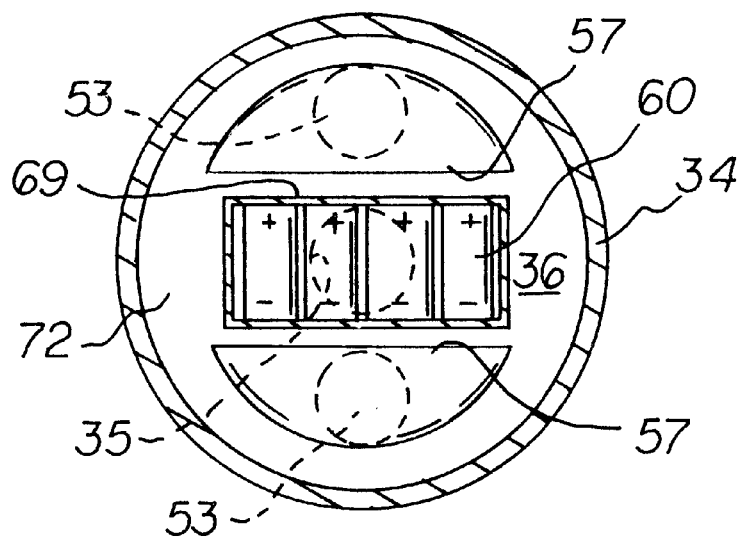
FIG. 20 is a cross-sectional view of the embodiment of the invention shown in FIG. 19 taken along line 19—19 thereof.
Figure 21:
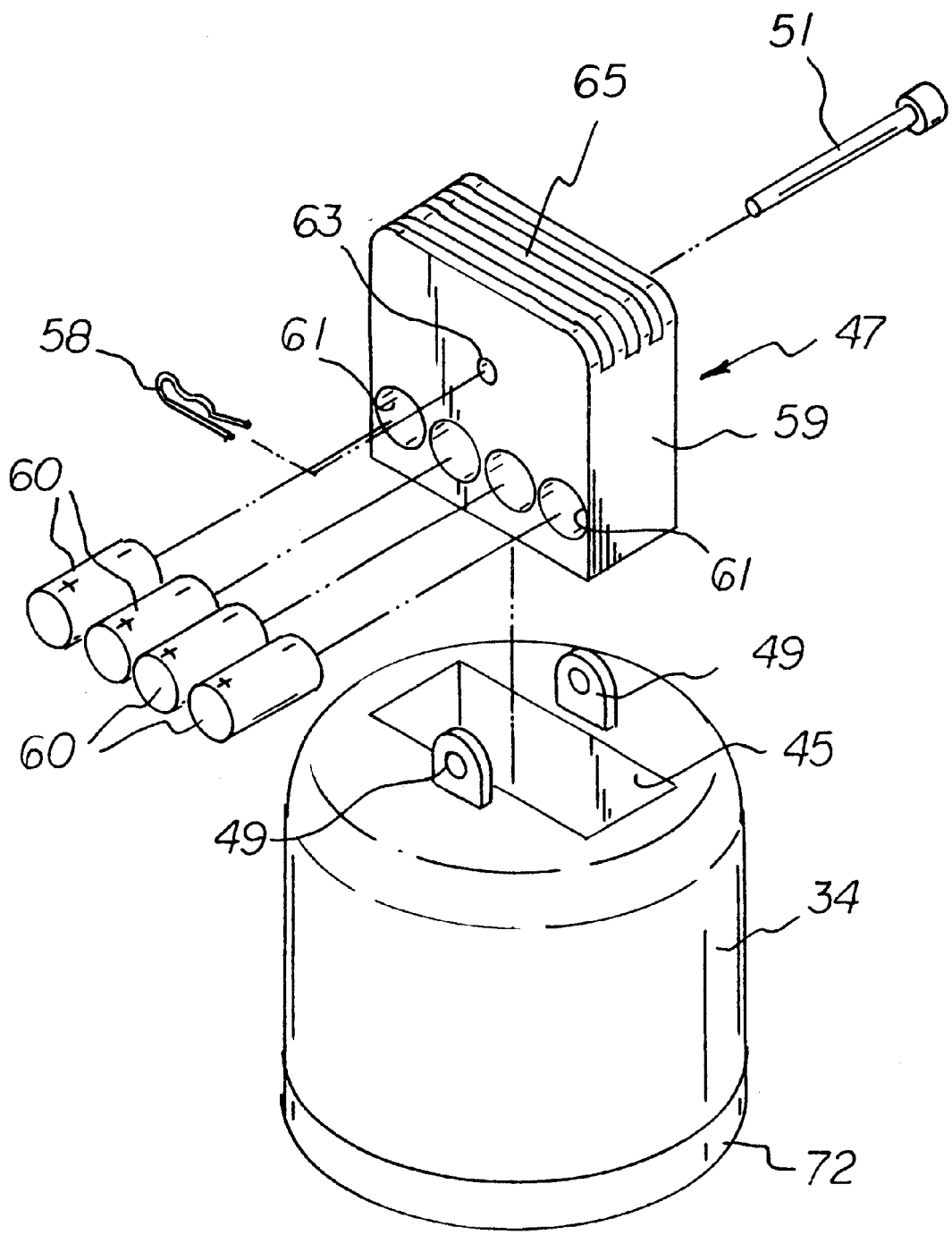
FIG. 21 is an exploded perspective view of the embodiment of the invention shown in FIGS. 17–20.

To use the first embodiment of the invention, the embodiment of the invention is first installed on the engine block 11. To do this, the oil filter cartridge 15 is unscrewed from the oil filter mounting stem 17. Then, the adaptor unit 12 is placed over the oil filter mounting stem 17, such that the oil filter mounting stem 17 passes through the mounting-stem-reception channel 16. As shown in FIG. 11, an adaptor-to-stem sealing nut 23 can be used to secure the adaptor unit 12 to the oil filter mounting stem 17. Moreover, the bottom of the adaptor unit 12 is pressed up against the engine block 11 so that the adaptor-to-block seal portion 18 forms an oil-tight seal against the engine block 11.

To secure the magnetic assembly 26 to the adaptor unit 12, the removable cap 38 is removed from the magnetic assembly housing 34. From the now-open top of the magnetic assembly housing 34, the first connector nipple 42 is passed through a bottom channel in the magnetic assembly housing 34 and is screwed into the adaptor-to-magnetic-assembly output channel 22. A magnetic-assembly-to-adaptor seal 29 helps maintain an oil-tight seal between the magnetic assembly housing 34 and the adaptor-to-magnetic-assembly output channel 22. Also, from the now-open top of the magnetic assembly housing 34, the second connector nipple 44 is passed through a bottom channel in the flow director baffle 40 and through another bottom channel in the magnetic assembly housing 34 and is screwed into the magnetic-assembly-to-adaptor input channel 24. Another magnetic-assembly-to-adaptor seal 29 is used to provide an oil-tight seal between the magnetic assembly housing 34 and the magnetic-assembly-to-adaptor input channel 24. Then, the removable cap 38 is replaced on the magnetic assembly housing 34. To do so, the tab-reception slots 48 are passed over the locking tabs 46, and the removable cap 38 is twisted so that the locking tabs 46 provide a locking engagement with the tab-reception ramps 50 of the removable cap 38. The cap-to-housing sealing ring 27 provides an oil-tight seal between the removable cap 38 and the magnetic assembly housing 34.

With all components of the first embodiment of the invention assembled on the engine block 11, the oil filter cartridge 15 is screwed onto the oil filter mounting stem 17. The bottom sealing ring 31 on the oil filter cartridge 15 forms an oil-tight seal between the oil filter cartridge 15 and the adaptor unit 12.

It is noted that securing of the magnetic oil filtering apparatus 10 is accomplished by two separate and distinct securing forces. The first is the push of the oil filter cartridge 15 onto the engine block 11 as the oil filter cartridge 15 is screwed onto the oil filter mounting stem 17. The adaptor unit 12 is squeezed between the oil filter cartridge 15 and the engine block 11 when this is done. The second securing force involves the pushing action of the adaptor-to-stem sealing nut 23 on the adaptor unit 12 when the adaptor-to-stem sealing nut 23 is screwed down on the oil filter mounting stem 17.

Once the magnetic oil filtering apparatus 10 and the oil filter cartridge 15 are fully installed, when the engine is in operation, with special reference to FIGS. 1–7 and 11, oil flows through the oil output channels 19 and into the block-to-adaptor input channel 20 in the adaptor unit 12. Inside the adaptor unit 12, oil flows through the adaptor-to-magnetic-assembly output channel 22, through the first connector nipple 42, and into the interior oil flow chamber 36 of the magnetic assembly 26. Inside the interior oil flow chamber 36, the oil flows past the top of the flow director baffle 40 so that the flowing oil is in the proximity of the magnetic lines of force of the magnet elements 32 so that metal particles in the flowing oil are separated from the flowing oil onto the inside wall of the removable cap 38 by magnetic attraction. Then, the oil which has been treated by the magnetic lines of force of the magnet elements 32 passes through the flow director baffle 40, through the second connector nipple 44, and through the magnetic-assembly-to-adaptor input channel 24 back into the adaptor unit 12. Inside the adaptor unit 12, the treated oil flows through the adaptor-to-filter-cartridge channel 25 and into the oil filter cartridge 15. The oil flows through the oil filter cartridge 15 in a conventional and out from the oil filter cartridge 15 into the stem oil input channel 21 and back into the engine block 11. In this way, oil is treated by the magnetic lines of force of the magnet elements 32 to remove metal particles from the oil prior to the oil's flowing through the oil filter cartridge 15.

Metal particles trapped by the magnet elements 32 are adhered to the inside surface of the removable cap 38. When it is desired to clean the metal particles off of the removable cap 38, the removable cap 38 is unscrewed from the magnetic assembly housing 34, the metal particles are cleaned off of the removable cap 38, and the removable cap 38 is replaced on the magnetic assembly housing 34.

Turning to FIGS. 8–13, a second embodiment of the invention is shown. Reference numerals are shown that correspond to like reference numerals that designate like elements shown in the other figures. In addition, an oil cooler assembly 13 is connected to the adaptor unit 12. The adaptor unit 12 includes an oil-cooler-output channel 52, an oil-cooler-input channel 54, and a shunt channel 56 located between the oil-cooler-output channel 52 and the oil-cooler-input channel 54. Connector fittings 55 are attached to the adaptor housing 14 and are associated with each of the oil-cooler-output channel 52 and the oil-cooler-input channel 54.

An output channel plug fits into the oil-cooler-output channel 52, and an input channel plug fits into the oil-cooler-input channel 54. A shunt channel plug 62 fits into the second quick-connect coupler 56. The interior oil flow chamber 36 includes a funnel portion 37 which is in communication with the magnetic-assembly-to-adaptor input channel 24.

With reference to FIG. 11, the second embodiment of the invention can be used in either of two ways. One way is like the first embodiment of the invention, that is, without the oil cooler assembly 13. The second way is with the oil cooler assembly 13.

When the oil cooler assembly 13 is not employed, the oil-cooler-output channel 52 and the oil-cooler-input channel 54 are plugged up by cooler channel plugs (not shown). That is, cooler channel plugs can be installed in the connector fittings 55 that are on the adaptor unit 12. Also, the shunt channel plug 62 is removed from the shunt channel 56. As a result, oil from the engine block 11 flows from the oil output channels 19, through the block-to-adaptor input channel 20, through the shunt channel 56, through the adaptor-to-magnetic-assembly output channel 22, through the interior oil flow chamber 36, through the funnel portion 37, through the adaptor-to-filter-cartridge channel 25, through the adaptor-to-filter-cartridge channel 25, through the oil filter cartridge 15, through the stem oil input channel 21, and back into the engine block 11.

On the other hand, when the oil cooler assembly 13 is employed, the cooler channel plugs (not shown) are removed from the oil-cooler-output channel 52 and the oil-cooler-input channel 54. In addition, the shunt channel plug 62 is screwed into the shunt channel 56 so that the shunt channel 56 is plugged up. When this is done, the circuit of oil is as follows. Oil flows out from the oil output channels 19 of the engine block 11, through the block-to-adaptor input channel 20, through the oil-cooler-output channel 52, through the oil cooling unit 53, through the oil-cooler-input channel 54, through the adaptor-to-magnetic-assembly output channel 22, through the interior oil flow chamber 36, through the funnel portion 37, through the adaptor-to-filter-cartridge channel 25, through the adaptor-to-filter-cartridge channel 25, through the oil filter cartridge 15, through the stem oil input channel 21, and back into the engine block 11.

Turning to FIGS. 14–16, a third embodiment of the invention is shown. Reference numerals are shown that correspond to like reference numerals that designate like elements shown in the other figures. In addition, the adaptor-to-stem seal is in a form of an expansion seal assembly 64. The expansion seal assembly 64 includes a first compression nut 66 supported on the oil filter mounting stem 17 on one side of the mounting-stem-reception channel 16, a generally frustoconically shaped compressible, annular internally-threaded sealing member 68 which can be fabricated of a known compressible, ductile and durable material such as soft metal or suitable polymer (i.e. synthetic plastic or rubber material), and a second compression nut 70. In accordance with the invention, sealing member 68 is supported on the oil filter mounting stem 17, is in contact with the first compression nut 66, and extends through the block-to-adaptor input channel 20 to a portion of a hollow-bored externally-threaded oil filter mounting stem plug adaptor or extension 17A axially protruding on the other side of the mounting-stem-reception channel 16. The aforementioned second compression nut 70 is supported on the oil filter mounting stem plug adaptor 17A on the other side of the mounting-stem-reception channel 16 and is in contact with the compressible, annular sealing member 68, substantially as shown in FIG. 14. Oil filter mounting stem plug adaptor 17A has the same thread size and outer dimensions as oil filter mounting stem 17 so that it can serve as an axial extension thereof.

To use the expansion seal assembly 64, when either embodiment of the invention is assembled, the first compression nut 66 is first suitably installed on the oil filter mounting stem 17. Then, the adaptor unit 12 is placed over the oil filter mounting stem 17 and compression nut 66. Then, the narrow end of the compressible, annular sealing member 68 is pushed into the mounting-stem-reception channel 16 of the adaptor unit 12 and threaded onto the oil filter mounting stem 17 so that a first portion of the compressible, annular sealing member 68 engages compression nut 66 and is on one side of the mounting-stem-reception channel 16, a second portion of the compressible, annular sealing member 68 is inside the mounting-stem-reception channel 16, and a third portion of the compressible, annular sealing member 68 is on another side of the mounting-stem-reception channel 16 (FIG. 14). Then, the second compression nut 70 is screwed onto plug adaptor 17A sufficiently to leave exposed a free end portion of the plug adaptor to the left of nut 70 as viewed in FIG. 14. The free end portion of plug adaptor 17A then is suitably screwed into the threaded bore of annular sealing member 68 until nut 70 engages the larger diameter end of sealing member 68 (right-most end as viewed in FIGS. 14 and 15). By the foregoing arrangement, when a conventional oil filter cartridge is screwed onto the plug adaptor 17A, to a sufficient degree, the compressible, annular sealing member 68 is compressed between the first compression nut 66, the mounting-stem-reception channel 16, and the second compression nut 70. As a result, an oil-tight seal is established between the adaptor unit 12, the oil filter mounting stem 17, the oil filter mounting stem plug adaptor 17A and the oil filter cartridge. Moreover, the expansion seal assembly 64 performs an additional function of helping to secure the adaptor unit 12 to the engine block 11 by exerting compressive holding forces to O-ring seal 18.

Turning to FIGS. 17–29, a fourth, fifth, sixth, and seventh embodiments of the invention are shown. Reference numerals are shown that correspond to like reference numerals that designate like elements shown in the other figures. The fourth, fifth, sixth, and seventh embodiments of the invention have a general magnetic assembly 26 apparatus in common. In general, a magnetic assembly 26 apparatus in accordance with the fourth through seventh embodiments of the invention includes a magnet assembly base plate 72 which includes base plate oil flow channels 73 and an internally threaded connection channel 78 for mounting on an externally threaded mounting. A magnetic assembly housing 34 is connected to the magnet assembly base plate 72. A magnet module 47 is connected to the magnetic assembly housing 34.

Turning now to FIGS. 17–21, the fourth embodiment of the invention is shown. Reference numerals are shown that correspond to like reference numerals that designate like elements shown in the other figures. In addition, a magnetic oil filtering apparatus 10 fits onto an engine block 11 which includes an oil filter mounting stem 17, oil output channels 19 associated with the oil filter mounting stem 17, a magnetic assembly mounting stem 35, and supplementary oil input channels 43 associated with the magnetic assembly mounting stem 35. The magnetic oil filtering apparatus 10 includes a magnetic assembly 26 mounted on the magnetic assembly mounting stem 35, wherein engine oil flows from the engine block 11, through the magnetic assembly mounting stem 35, through the magnetic assembly 26, and back to the engine block 11 through the supplementary oil input channels 43 for separating metal particles out from the engine oil by the magnetic assembly 26.

With this embodiment of the invention, the engine block 11 is originally manufactured as an OEM product to include the magnetic assembly mounting stem 35 and the supplementary oil input channels 43. With this embodiment of the invention, a conventional oil filter cartridge 15 is fitted onto a conventional oil filter mounting stem 17.

More specifically, the magnetic assembly 26 includes a magnet assembly base plate 72 which includes base plate oil flow channels 73 which are in communication with the supplementary oil input channels 43 of the engine block 11. The magnet assembly base plate 72 includes an internally threaded connection channel 78 which is connected to the magnetic assembly mounting stem 35. A magnetic assembly housing 34 is connected to the magnet assembly base plate 72, wherein the magnetic assembly housing 34 which includes a magnet module reception well 45, and magnet module support brackets 49 are located adjacent to the magnet module reception well 45. A magnet module 47 is received in the magnet module reception well 45 and is supported by the magnet module support brackets 49. A module retention pin 51 is threaded through the magnet module support brackets 49 and the magnet module 47 for retaining the magnet module 47 in the magnet module reception well 45.

The magnet module reception well 45 includes well side walls 69 and a well floor 67 located at distal ends of the well side walls 69. The well floor 67 includes a concave outer wall surface 71 facing the magnetic assembly mounting stem 35 for directing oil flow inside the interior oil flow chamber 36 and around the well side walls 69 to the funnel input ends 57. A pin locking member 58 is connected to a distal end of the module retention pin 51.

The magnetic assembly housing 34 defines an interior oil flow chamber 36, and the magnet module reception well 45 is located in a central portion of the interior oil flow chamber 36.

The magnetic assembly 26 further includes a pair of oil flow funnels 53 connected to the magnet assembly base plate 72 and in communication with the base plate oil flow channels 73 and extending into the interior oil flow chamber 36. Each of the oil flow funnels 53 includes a funnel input end 57 located adjacent to a side wall of the magnet module reception well 45. Each of the oil flow funnels 53 is located beside a central longitudinal axis 80 in the magnetic assembly housing 34.

The magnet module 47 includes a magnet reception block 59 which includes magnet reception channels 61 and a retention pin reception channel 63. A plurality of cylindrical magnets 60 are received in the magnet reception block 59. The cylindrical magnets 60 are in registration with the funnel input ends 57 when the magnet module 47 is placed in the magnet module reception well 45. The magnet reception block 59 includes a top heat sink portion 65.

With the fourth embodiment of the invention, an oil pump 74 provides engine oil under pressure to both a conventional oil filter cartridge 15 and the fourth embodiment of the invention, a supplementary pressure pipe 75 carries pressurized oil from the oil pump 74 to the magnetic assembly mounting stem 35 which feeds engine oil to the magnetic assembly 26. The magnet assembly base plate 72 is screwed onto the magnetic assembly mounting stem 35, and a supplementary sealing ring 76 provides an oil tight seal between the magnet assembly base plate 72 and the engine block 11.

With the fourth embodiment of the invention, the magnet assembly base plate 72 has an internally threaded connection channel 78, and the internally threaded connection channel 78 is screwed onto the externally threaded magnetic assembly mounting stem 35. In use, oil flows from the supplementary pressure pipe 75, through the magnetic assembly mounting stem 35, and into the interior oil flow chamber 36 of the magnetic assembly 26. Oil then flows around the well floor 67 and along the well side walls 69 of the magnet module reception well 45. A small gap is present between each of the funnel input ends 57 of the oil flow funnels 53, and a strong magnetic field is exerted on the oil that passes through the small gap and into the funnel input end 57. The strong magnetic field is provided by the cylindrical magnets 60 in the magnet module 47 which are placed in registration with the funnel input ends 57. The strong magnetic field attracts and holds ferro-magnetic particles against the exterior surfaces of the well side walls 69, thereby separating the ferro-magnetic particles out from the engine oil and retaining them on the well side walls 69.

When it is desired to clean the magnetic assembly 26, the magnetic assembly 26 is unscrewed from the magnetic assembly mounting stem 35. The pin locking member 58 is removed from the module retention pin 51, and the module retention pin 51 is pulled out from the magnet module support brackets 49 and the retention pin reception channel 63. Then, the magnet module 47 is removed from the magnet module reception well 45. Then, the ferro-magnetic particles, which were retained on the well side walls 69 under the influence of the magnetic fields exerted by the cylindrical magnets 60, are released from the well side walls 69 and can be cleaned out of the magnetic assembly 26.

After the ferro-magnetic particles have been cleaned out from the magnetic assembly 26, the magnet module 47 is reconnected with the magnetic assembly housing 34 using the module retention pin 51 and the pin locking member 58, and the magnet assembly base plate 72 is screwed back onto the magnetic assembly mounting stem 35.

Turning to FIGS. 22–25, the fifth embodiment of the invention is shown. Reference numerals are shown that correspond to like reference numerals that designate like elements shown in the other figures. In addition, a magnetic oil filtering apparatus 10 fits onto an oil filter mounting stem 17 of an engine block 11 which includes oil output channels 19. An adaptor unit 12 is mounted on the oil filter mounting stem 17, wherein the adaptor unit 12 includes an adaptor housing 14, a mounting-stem-reception channel 16 in the adaptor housing 14, an adaptor-to-stem seal received on the oil filter mounting stem 17 for sealing off the mounting-stem-reception channel 16, an adaptor-to-block seal portion 18 located on a bottom portion of the adaptor unit 12, a block-to-adaptor input channel 20 for receiving oil flow from the oil output channels 19 of the engine block 11, a combination adaptor-to-magnetic-assembly output channel and magnetic assembly mounting stem 77, a magnetic-assembly-to-adaptor input channel 24, and an adaptor-to-filter-cartridge channel 25 which is in communication with the magnetic-assembly-to-adaptor input channel 24. A magnetic assembly 26 is mounted on the adaptor unit 12. Engine oil flows from the engine block 11, through the oil output channels 19, through the adaptor unit 12, through the magnetic assembly 26, and back to the adaptor unit 12 for separating metal particles out from the engine oil by the magnetic assembly 26.

The magnetic assembly 26 includes a magnetic assembly housing 34 connected to the magnet assembly base plate 72 which is connected to the combination adaptor-to-magnetic-assembly output channel and magnetic assembly mounting stem 77, and wherein the magnetic assembly housing 34 defines an interior oil flow chamber 36 between the combination adaptor-to-magnetic-assembly output channel and magnetic assembly mounting stem 77 and the magnetic-assembly-to-adaptor input channel 24.

The fifth embodiment of the invention also includes an oil cooler assembly 13 as does the second embodiment of the invention which also includes an oil cooler assembly 13. With respect to the oil cooler assembly 13, operation of the fifth and second embodiments of the invention are virtually the same, as described above in relation to the second embodiment of the invention. Also, in most other aspects, the operation of the fifth embodiment of the invention is very similar to the operation of the second embodiment of the invention described above. However, there are a few differences in operation between the second and fifth embodiments of the invention. For example, with the fifth embodiment of the invention, oil flows in the adaptor unit 12 from the combination adaptor-to-magnetic-assembly output channel and magnetic assembly mounting stem 77, through the internally threaded connection channel 78, and into the interior oil flow chamber 36.

With the fifth embodiment of the invention, once the oil is in the interior oil flow chamber 36, then the flow of oil through the magnetic assembly 26 is as described above for the fourth embodiment of the invention.

Figure 26:
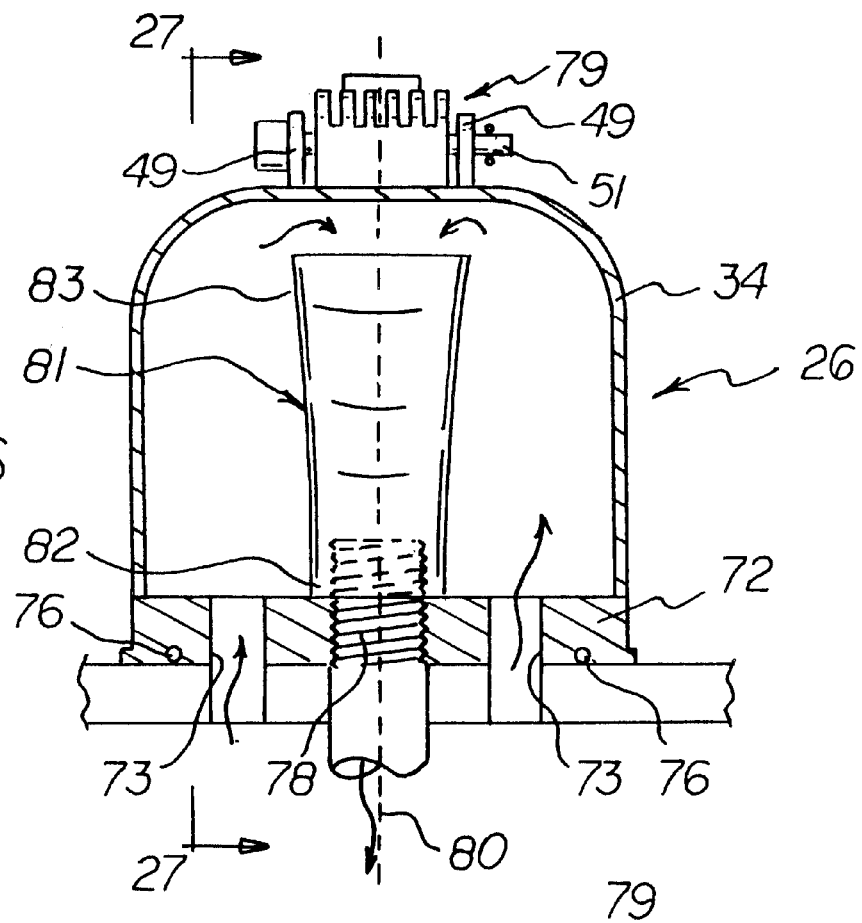
FIG. 26 is a cross-sectional view of a sixth embodiment of the invention which includes magnet elements affixed to the outside and top of a magnetic assembly housing using an attachment pin.
Figure 27:
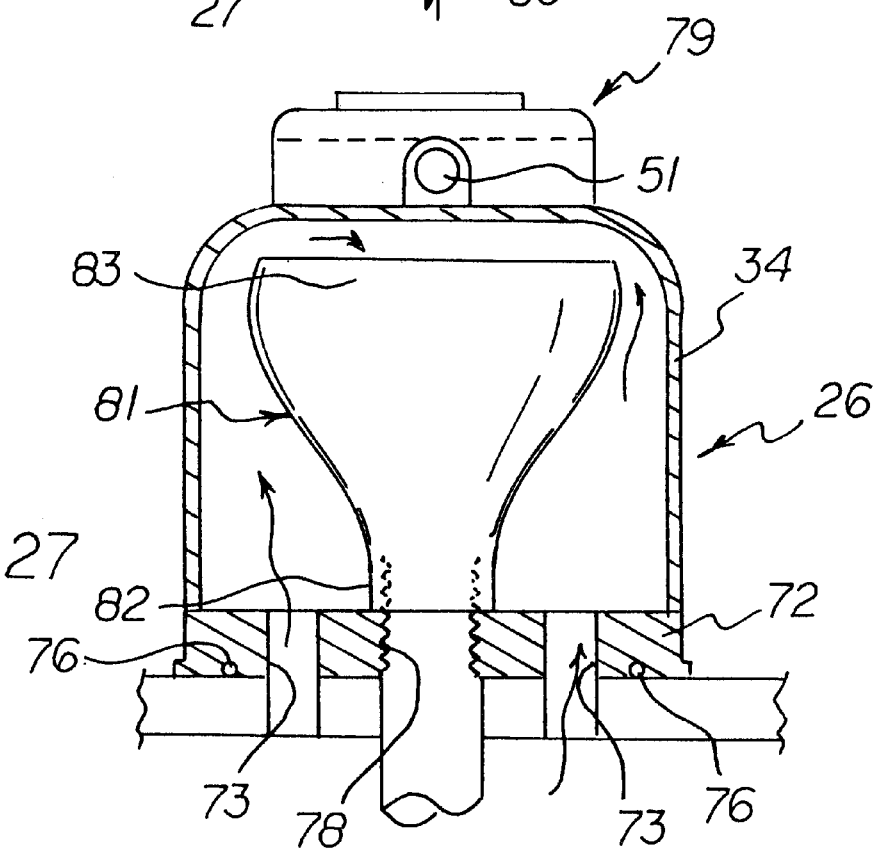
FIG. 27 is a cross-sectional view of the embodiment of the invention shown in FIG. 26 taken along line 27—27 thereof.

Turning to FIGS. 26 and 27, the sixth embodiment of the invention is shown. Reference numerals are shown that correspond to like reference numerals that designate like elements shown in the other figures. In addition, the magnet module is in a form of a top-mounted magnet module 79 that is located on a top portion of the magnetic assembly housing 34. The top-mounted magnet module 79 is secured to the magnetic assembly housing 34 by magnet module support brackets 49 and a module retention pin 51 which is threaded through the top-mounted magnet module 79 and the magnet module support brackets 49.

An inlet-to-magnet-area flow director 81 is connected to the magnet assembly base plate 72. The inlet-to-magnet-area flow director 81 has an inlet end 82 surrounding the internally threaded connection channel 78 and has an outlet end 83 in close proximity to a top portion of the magnetic assembly housing 34, under the top-mounted magnet module 79. The inlet-to-magnet-area flow director 81 surrounds a portion of the central longitudinal axis 80 of the magnetic assembly housing 34.

Figure 28:
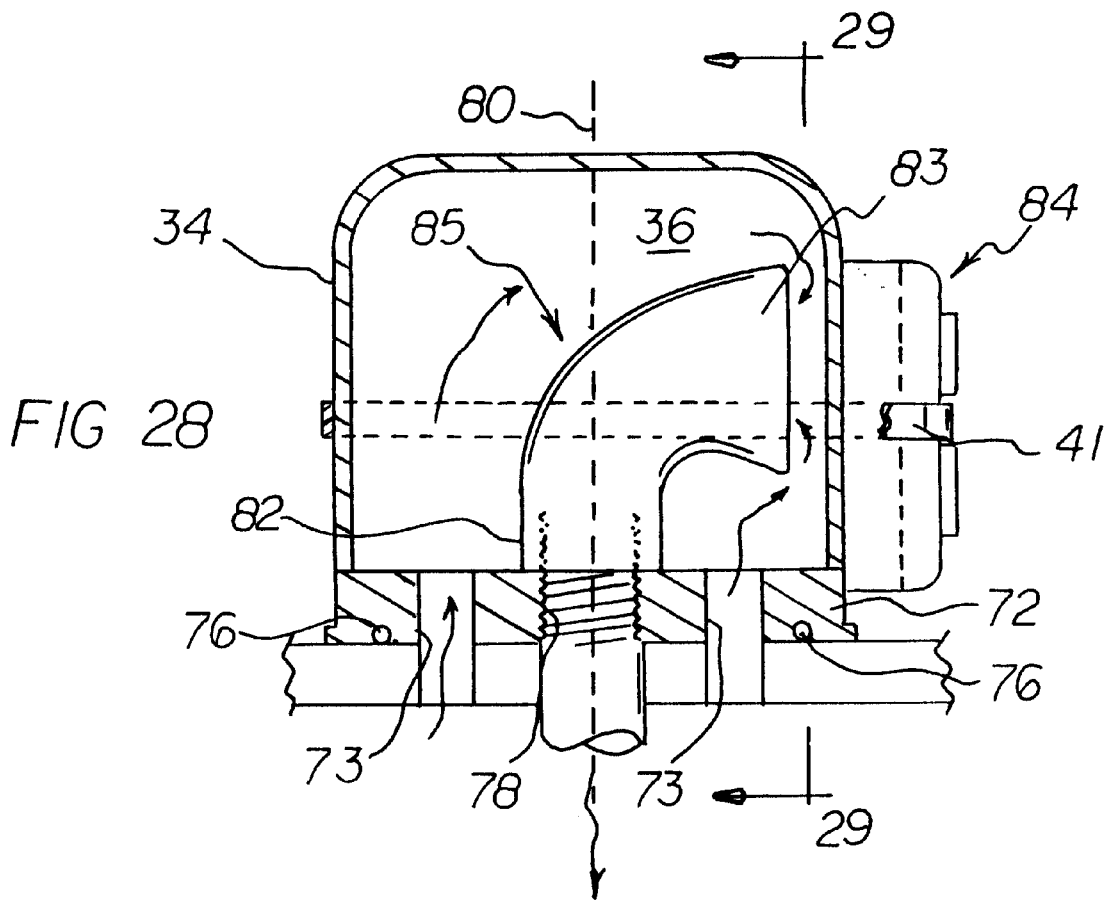
FIG. 28 is a cross-sectional view of a seventh embodiment of the invention which includes magnet elements affixed to the outside and side of a magnetic assembly housing using a housing encircling attachment strap.
Figure 29:
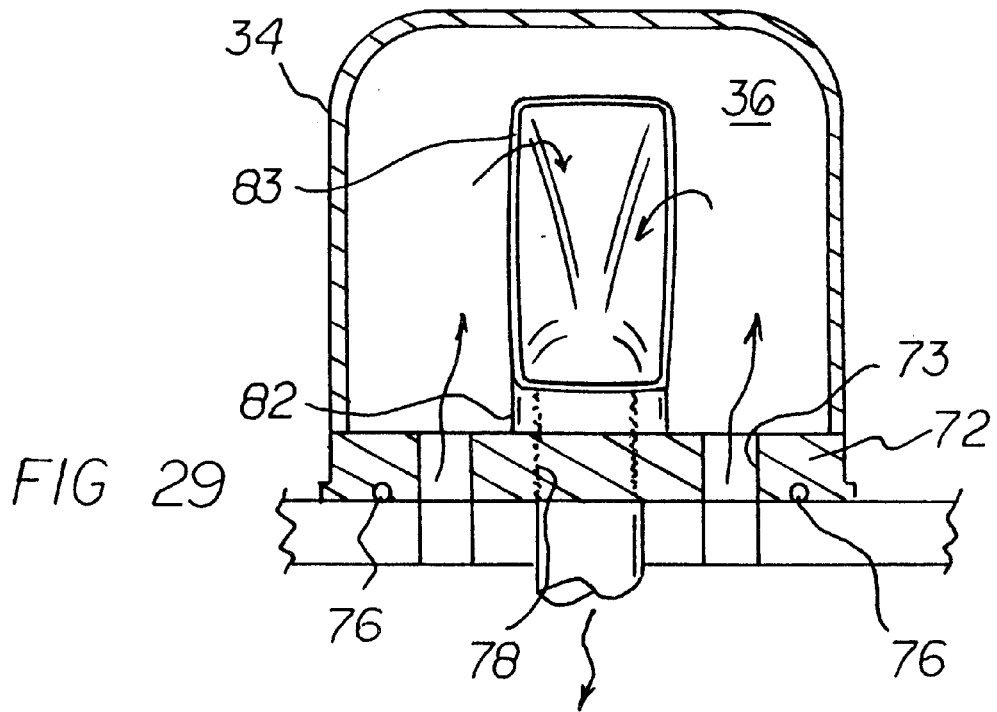
FIG. 29 is a cross-sectional view of the embodiment of the invention shown in FIG. 28 taken along line 29—29 thereof.

Turning to FIGS. 28 and 29, the seventh embodiment of the invention is shown. Reference numerals are shown that correspond to like reference numerals that designate like elements shown in the other figures. In addition, the magnet module is in a form of a side-mounted magnet module 84 that is located on a side portion of the magnetic assembly housing 34. The side-mounted magnet module 84 is secured to the magnetic assembly housing 34 by of a housing/module encircling attachment strap 41. An inlet-to-magnet-area flow director 85 is connected to the magnet assembly base plate 72. The inlet-to-magnet-area flow director 85 has an inlet end 82 surrounding the internally threaded connection channel 78 and has an outlet end 83 in close proximity to a side portion of the magnetic assembly housing 34, besides the side-mounted magnet module 84.

A bottom portion of the side-mounted magnet module 84 surrounds a portion of the central longitudinal axis 80 and is parallel to the central longitudinal axis 80 of the magnetic assembly housing 34. Also, a top portion of the side-mounted magnet module 84 is perpendicular to the central longitudinal axis 80.

The side-mounted magnet module 84 can be a magnet module such as disclosed by the present inventor in his issued U.S. Pat. No. 5,510,024, incorporated herein by reference.

Operation of the sixth and seventh embodiments of the invention are similar to each other. With the sixth and seventh embodiments of the invention, oil flows through the base plate oil flow channels 73, into the interior oil flow chamber 36, between a gap between the portion of the magnetic assembly housing 34 on which a respective mounted magnet module and a respective outlet end of a respective inlet-to-magnet-area flow director. Then, the oil flows into the respective inlet-to-magnet-area flow director, past the internally threaded connection channel 78, and into the engine oil circulation system.

More specifically, with the sixth embodiment of the invention, a gap exists between the outlet end 83 of the inlet-to-magnet-area flow director 81 and the top portion of the magnetic assembly housing 34 adjacent to the top-mounted magnet module 79. More specifically with the seventh embodiment of the invention, a gap exists between the outlet end 83 of the inlet-to-magnet-area flow director 85 and the side portion of the magnetic assembly housing 34 adjacent to the side-mounted magnet module 84. Strong magnetic flux is located at the respective gaps between the respective outlet ends of the inlet-to-magnet-area flow directors and the respective portions of the magnetic assembly housing 34 adjacent to the respective magnet modules. Ferro-magnetic particles are separated from the oil and are trapped on the respective wall portions by the strong magnetic flux.

The components of the magnetic oil filtering apparatus of the invention can be made from inexpensive and durable heat and oil-resistant metal, plastic, and rubber materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved magnetic oil filtering apparatus that is low in cost, relatively simple in design and operation, and which is not affixed to an oil filter cartridge. With the invention, a magnetic oil filtering apparatus is provided which increases the efficiency of the separation of metal particles from engine oil over a magnetic assembly affixed to an oil filter cartridge. With the invention, a magnetic oil filtering apparatus is provided which is interposed between an engine block and a conventional, unaltered oil filter cartridge. With the invention, a magnetic oil filtering apparatus provides both magnetic filtering and oil cooling. With the invention, a magnetic oil filtering apparatus provides a good oil seal between an adaptor and an engine block. With the invention, a magnetic oil filtering apparatus provides a good oil seal between the adaptor and the oil filter mounting stem.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed is:

1. A magnetic oil filtering apparatus for use with an engine block, said engine block including an oil filter mounting stem, oil output channels associated with the oil filter mounting stem, a magnetic assembly mounting stem, and supplementary oil input channels associated with the magnetic assembly mounting stem, comprising:

a magnetic assembly mounted on the magnetic assembly mounting stem, wherein engine oil flows from the engine block, through the magnetic assembly mounting stem, through said magnetic assembly, and back to the engine block through the supplementary oil input channels for separating metal particles out from the engine oil by said magnetic assembly, wherein said magnetic assembly includes:
- a magnet assembly base plate which includes base plate oil flow channels which are in communication with the supplementary oil input channels of the engine block, wherein said magnet assembly base plate includes an internally threaded connection channel which is connected to the magnetic assembly mounting stem,
- a magnetic assembly housing connected to said magnet assembly base plate, wherein said magnetic assembly housing which includes a magnet module reception well and magnet module support brackets located adjacent to said magnet module reception well,
- a magnet module received in said magnet module reception well and supported by said magnet module support brackets, and
- a module retention member cooperating with said magnet module support brackets and said magnet module for retaining said magnet module in said magnet module reception well.

2. A magnetic assembly apparatus, comprising:
- a magnet assembly base plate which includes base plate oil flow channels and internally threaded connection channel for mounting on an externally threaded mounting means,
- a magnetic assembly housing connected to said magnet assembly base plate, and
- a magnet module connected to said magnetic assembly housing, wherein:
said magnetic assembly housing includes a magnet module reception well and magnet module support brackets located adjacent to said magnet module reception well,
said magnet module is received in said magnet module reception well and is supported by said magnet module support brackets connected to said magnetic assembly housing adjacent to said magnet module reception well, and
a module retention member cooperating with said module support brackets and said magnet module for retaining said magnet module in said magnet module reception well.

3. The apparatus of claim 2 wherein said magnet module reception well includes well side walls and a well floor located at distal ends of said well side walls.

4. The apparatus of claim 3 wherein said well floor includes a concave outer wall surface facing the magnetic assembly mounting stem for directing oil flow inside said interior oil flow chamber and around said well side walls to said funnel input ends.

5. The apparatus of claim 2 wherein said module retention member cooperating with said magnet module support brackets and said magnet module for retaining said magnet module in said magnet module reception well comprises a module retention pin threaded through said magnet module support brackets and said magnet module.

6. The apparatus of claim 5, further including:
a pin locking member connected to a distal end of said module retention pin.

7. The apparatus of claim 2 wherein:
said magnetic assembly housing defines an interior oil flow chamber, and
said magnet module reception well is located in a central portion of said interior oil flow chamber.

8. The apparatus of claim 3, further including:
a pair of oil flow funnels connected to said magnet assembly base plate and in communication with said base plate oil flow channels and extending into said interior oil flow chamber, wherein each of said oil flow funnels includes a funnel input end located adjacent to a side wall of said magnet module reception well.

9. The apparatus of claim 8 wherein each of said oil flow funnels is located beside a central longitudinal axis in said magnetic assembly housing.

10. The apparatus of claim 8 wherein said magnet module includes:
a magnet reception block which includes magnet reception channels and a retention pin reception channel, and
a plurality of cylindrical magnets received in said magnet reception block.

11. The apparatus of claim 10 wherein said magnet reception block includes a top heat sink portion.

12. The apparatus of claim 10 wherein said cylindrical magnets are in registration with said funnel input ends when said magnet module is placed in said magnet module reception well.

13. The apparatus of claim 1 wherein said module retention member cooperating with said magnet module support brackets and said magnet module for retaining said magnet module in said magnet module reception well comprises a module retention pin threaded through said magnet module support brackets and said magnet module.

14. A magnetic assembly apparatus, comprising:
a magnet assembly base plate which includes base plate oil flow channels and internally threaded connection channel for mounting on an externally threaded mounting means,
a magnetic assembly housing connected to said magnet assembly base plate, and
a magnet module connected to said magnetic assembly housing,
wherein said magnet module is in a form of a top-mounted magnet module that is located on a top portion of said magnetic assembly housing,
wherein said top-mounted magnet module is secured to said magnetic assembly housing by means of magnet module support brackets and a module retention member cooperating with said top-mounted magnet module and said magnet module support brackets,
said apparatus further including:
an inlet-to-magnet-area flow director connected to said magnet assembly base plate, having an inlet end surrounding said internally threaded connection channel, and having an outlet end in close proximity to a top portion of said magnetic assembly housing, under said top-mounted magnet module.

15. The apparatus of claim 14 wherein said inlet-to-magnet-area flow director surrounds a portion of the central longitudinal axis of said magnetic assembly housing.

16. A magnetic assembly apparatus, comprising:
a magnet assembly base plate which includes base plate oil flow channels and internally threaded connection channel for mounting on an externally threaded mounting means, a magnetic assembly housing connected to said magnet assembly base plate, and a magnet module connected to said magnetic assembly housing, wherein said magnet module is in a form of a side-mounted magnet module that is located on a side portion of said magnetic assembly housing, further including:

an inlet-to-magnet-area flow director connected to said magnet assembly base plate, having an inlet end surrounding said internally threaded connection channel, and having an outlet end in close proximity to a side portion of said magnetic assembly housing, besides said side-mounted magnet module.

17. The apparatus of claim 16 wherein said side-mounted magnet module is secured to said magnetic assembly housing by means of a housing/module encircling attachment strap.

18. The apparatus of claim 16 wherein said magnetic assembly has a central longitudinal axis, wherein a bottom portion of said side-mounted magnet module surrounds a portion of said central longitudinal axis and is parallel to said central longitudinal axis of said magnetic assembly housing, and wherein a top portion of said side-mounted magnet module extends in a perpendicular direction with respect to said central longitudinal axis.

* * * * *